(12) United States Patent
Shetty

(10) Patent No.: US 10,584,781 B2
(45) Date of Patent: Mar. 10, 2020

(54) HYDRO-MECHANICAL TRANSMISSION

(71) Applicant: EATON INTELLIGENT POWER LIMITED, Dublin (IE)

(72) Inventor: Nikhil Shyamsunder Shetty, Mumbai (IN)

(73) Assignee: Eaton Intelligent Power Limited, Dublin (IE)

(*) Notice: Subject to any disclaimer, the term of this patent is extended or adjusted under 35 U.S.C. 154(b) by 67 days.

(21) Appl. No.: 15/753,846

(22) PCT Filed: Aug. 18, 2016

(86) PCT No.: PCT/US2016/047655
§ 371 (c)(1),
(2) Date: Feb. 20, 2018

(87) PCT Pub. No.: WO2017/031379
PCT Pub. Date: Feb. 23, 2017

(65) Prior Publication Data
US 2019/0011029 A1 Jan. 10, 2019

(30) Foreign Application Priority Data

Aug. 20, 2015 (IN) .......................... 2569/DEL/2015

(51) Int. Cl.
*F16H 39/14* (2006.01)
*F16H 47/02* (2006.01)
(Continued)

(52) U.S. Cl.
CPC .......... *F16H 39/14* (2013.01); *B60K 17/105* (2013.01); *F16H 47/02* (2013.01); *F16H 61/42* (2013.01)

(58) Field of Classification Search
CPC .......... F16H 39/10; F16H 39/14; F16H 47/02; F16H 61/42; B60K 17/10; B60K 17/105
(Continued)

(56) References Cited

U.S. PATENT DOCUMENTS 2,569,562 A * 10/1951 Froebe .................... F16H 39/14
60/453
3,131,539 A * 5/1964 Creighton ............... F16H 39/14
60/487
(Continued)

FOREIGN PATENT DOCUMENTS

GB 916 485 A 1/1963

OTHER PUBLICATIONS

International Search Report and Written Opinion of the International Searching Authority for corresponding International Patent Application No. PCT/US2016/047655 dated Nov. 25, 2016, 7 pages.
(Continued)

*Primary Examiner* — F Daniel Lopez
*Assistant Examiner* — Michael Quandt
(74) *Attorney, Agent, or Firm* — Merchant & Gould P.C.

(57) ABSTRACT

The present disclosure relates to a hydro-mechanical transmission having two rotating groups that mount on a common shaft. At least one of the rotating groups operates as a variable displacement pump or motor. At least one of the rotating groups interacts with a torque transfer unit rotatable about the shaft axis relative to both the shaft and the rotating group. The torque transfer unit includes a valve plate, a swash plate and a torque output section that all rotate in unison with one another about the shaft axis relative to the shaft and the rotating group. The valve plate includes an inlet
(Continued)

passage for inletting hydraulic fluid to the rotating group and an outlet passage for outletting hydraulic fluid from the rotating group.

19 Claims, 20 Drawing Sheets

(51) Int. Cl.
 *B60K 17/10* (2006.01)
 *F16H 61/42* (2010.01)
(58) Field of Classification Search
 USPC .................................................. 60/487, 489
 See application file for complete search history.

(56) References Cited

U.S. PATENT DOCUMENTS

| | | |
|---|---|---|
| 3,543,514 A | 12/1970 | Reimer |
| 4,827,721 A | 5/1989 | Hayashi et al. |
| 4,875,390 A | 10/1989 | Hayashi et al. |
| 5,054,289 A | 10/1991 | Nagatomo |
| 5,396,768 A | 3/1995 | Zulu |
| 2004/0163490 A1 | 8/2004 | Nakatani et al. |
| 2010/0205951 A1 | 8/2010 | Leker |
| 2013/0269328 A1 | 10/2013 | Iwaki et al. |

OTHER PUBLICATIONS

Extended European Search Report for European Patent Application No. 16837879.2 dated Apr. 1, 2019, 7 pages.

\* cited by examiner

HYDRO-MECHANICAL TRANSMISSION

CROSS-REFERENCE TO RELATED APPLICATION

This application is a U.S. National Stage Application of PCT/US2016/047655, filed on Aug. 18, 2016, which claims the benefit of Indian Patent Application No. 2569/DEL/2015, filed on Aug. 20, 2015, the disclosures of which are incorporated herein by reference in their entireties. To the extent appropriate, a claim of priority is made to each of the above disclosed applications.

BACKGROUND

Hydro-mechanical Transmissions (HMT) can be used to supply or transfer mechanical power. Conventional examples of HMTs implement the use of planetary gears. However, these embodiments are large in size and expensive to build, which typically limits their use to large horsepower machines. Attempts have been made to reduce the overall complexity of HMTs by implementing various solutions. For example, in U.S. Pat. No. 3,543,514, the disclosure implements a rotating housing, along with rotating and swiveling swash plates. However, this configuration presents setbacks because it is difficult to practically implement. Further, the disclosure in U.S. Pat. No. 5,054,289 provides another example where a highly complex component is attributable to high manufacturing/assembly costs. In this example, the complex system is a valve mechanism, which includes a large number of parts. Thus, there remains a need for a HMT system that enables a compact and low cost HMT ideal for low horsepower off-road machines.

SUMMARY

Some or all of the above needs and/or problems can be addressed by certain examples of the disclosure. The disclosure describes examples of an input coupled HMT architecture. In an example, a variable displacement pump can be coupled with a fixed displacement motor. The pump and the motor can each include a rotating group. The pump can comprise a non-rotating swash plate, while the motor can comprise a rotating swash plate. The two rotary groups can be coupled by means of an input shaft that runs through the entire assembly. The swash plate of the motor can serve as a variable torque output, while the input shaft can receive torque at one end (i.e., an input end) and serve as a power transfer output (PTO) at the other end. The two rotary units can also be hydraulically coupled by means of a relatively simple valving mechanism. Within the valving mechanism, a pump valve can be stationary while a motor valve can be rotating. The rotating valve of the motor can be coupled to the motor swash plate so the motor valve and the motor swash plate are configured to rotate in unison relative to the motor rotating group and the shaft. During operation, system cycles hydraulic fluid between the two rotary groups to transfer power from the pump rotating group, through the motor rotating group to the torque output corresponding to the motor swash plate.

Certain examples of the disclosure can include a system that provides a compact reduced complexity hydro-mechanical transmission system. According to one example, the system can comprise a hydro-mechanical transmission comprising a shaft rotatable about a shaft axis, where the shaft has an input end and a power take-off end. The system can also comprise a pump rotating group that includes a pump cylinder barrel that rotates in unison with the shaft about the shaft axis. Further, the pump rotating group can also include a plurality of pump pistons that axially reciprocate within pump cylinders defined by the pump cylinder barrel. The pump pistons can include pump piston shoes.

The system can include a pump swash plate that does not rotate with the shaft about the shaft axis. The pump swash plate can be angularly adjustable relative to the shaft axis to adjust a displacement of the pump rotating group. Further, the pump piston shoes can be configured to ride on the pump swash plate. The hydro-mechanical transmission system can comprise a pump valve plate that does not rotate with the shaft about the shaft axis. The pump valve plate can include a pump output passage for outputting hydraulic fluid pumped from the pump rotating group and a pump inlet passage for returning hydraulic fluid to the pump rotating group.

The system can include a motor rotating group including a motor cylinder barrel that rotates in unison with the shaft about the shaft axis. The motor rotating group can also include a plurality of motor pistons that axially reciprocate within motor cylinders defined by the motor cylinder barrel. Further, the motor pistons can include motor piston shoes.

The system can include a torque output unit rotatable about the shaft axis relative to both the shaft and the motor rotating group. The torque output unit can include a motor valve plate, a motor swash plate and a motor torque output section that all rotate in unison with one another about the shaft axis relative to the shaft and the motor rotating group. The motor valve plate can comprise a motor inlet passage that provides fluid communication between the pump outlet passage and the motor rotating group and a motor outlet passage that provides fluid communication between the motor rotating group and the pump inlet passage. The motor piston shoes can be configured to ride on the motor swash plate.

Other examples, features, and aspects of the disclosure are described in detail herein and are considered a part of the claimed disclosure. Other examples, features, and aspects can be understood with reference to the following detailed description, accompanying drawings and claims.

BRIEF DESCRIPTION OF DRAWINGS

The accompanying drawings, which are incorporated in and constitute a part of the description, illustrate aspects of the present disclosure. A brief description of the drawings is as follows.

DETAILED DESCRIPTION

Reference will not be made in detail to exemplary aspects of the present disclosure that are illustrated in the accompanying drawings. Where ever possible, the same reference numbers will be used throughout the drawings to refer to the same or like parts.

Figure 1:
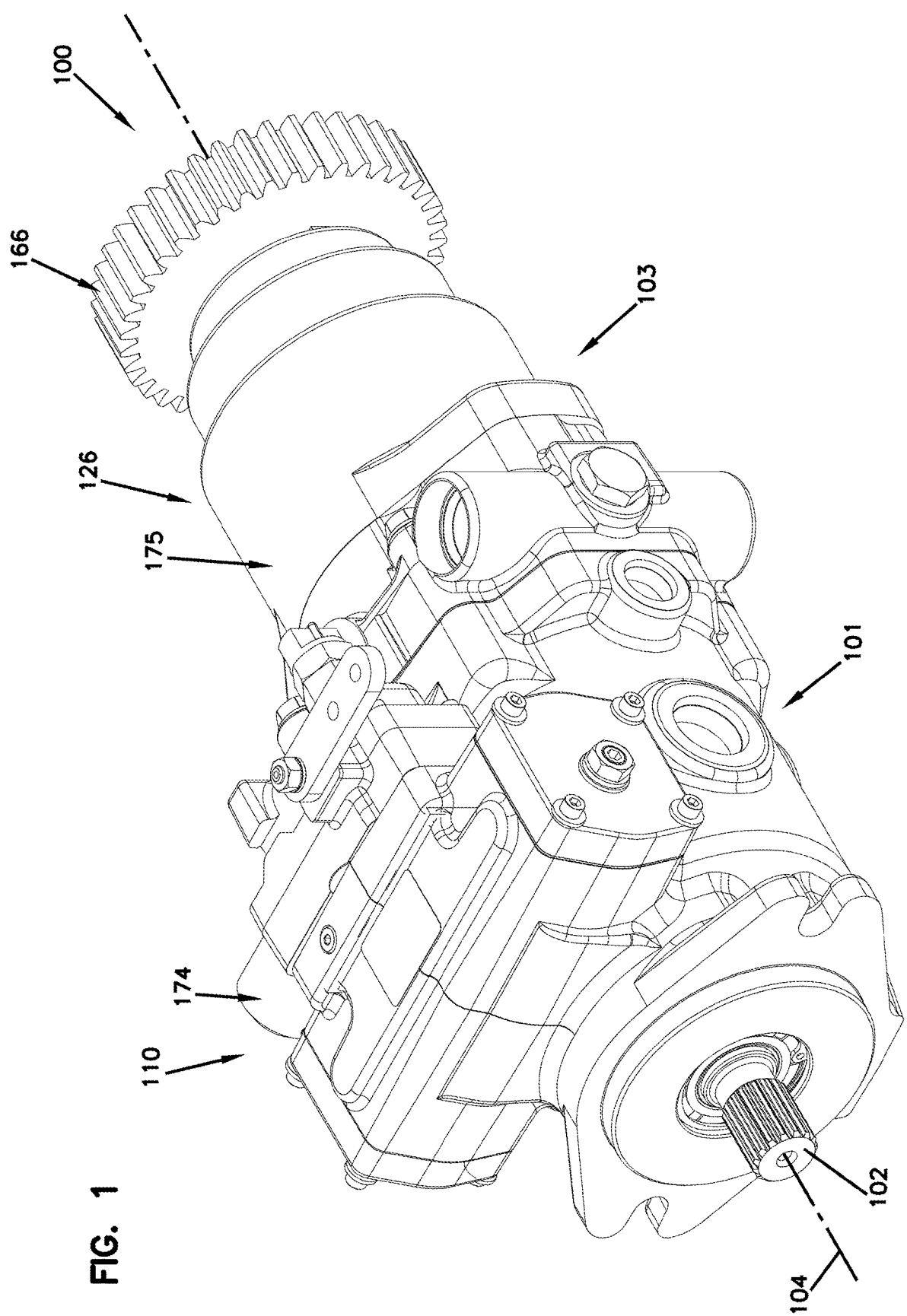
FIG. 1 is a front isometric view of a hydro-mechanical transmission (HMT) of the disclosure.
Figure 2:
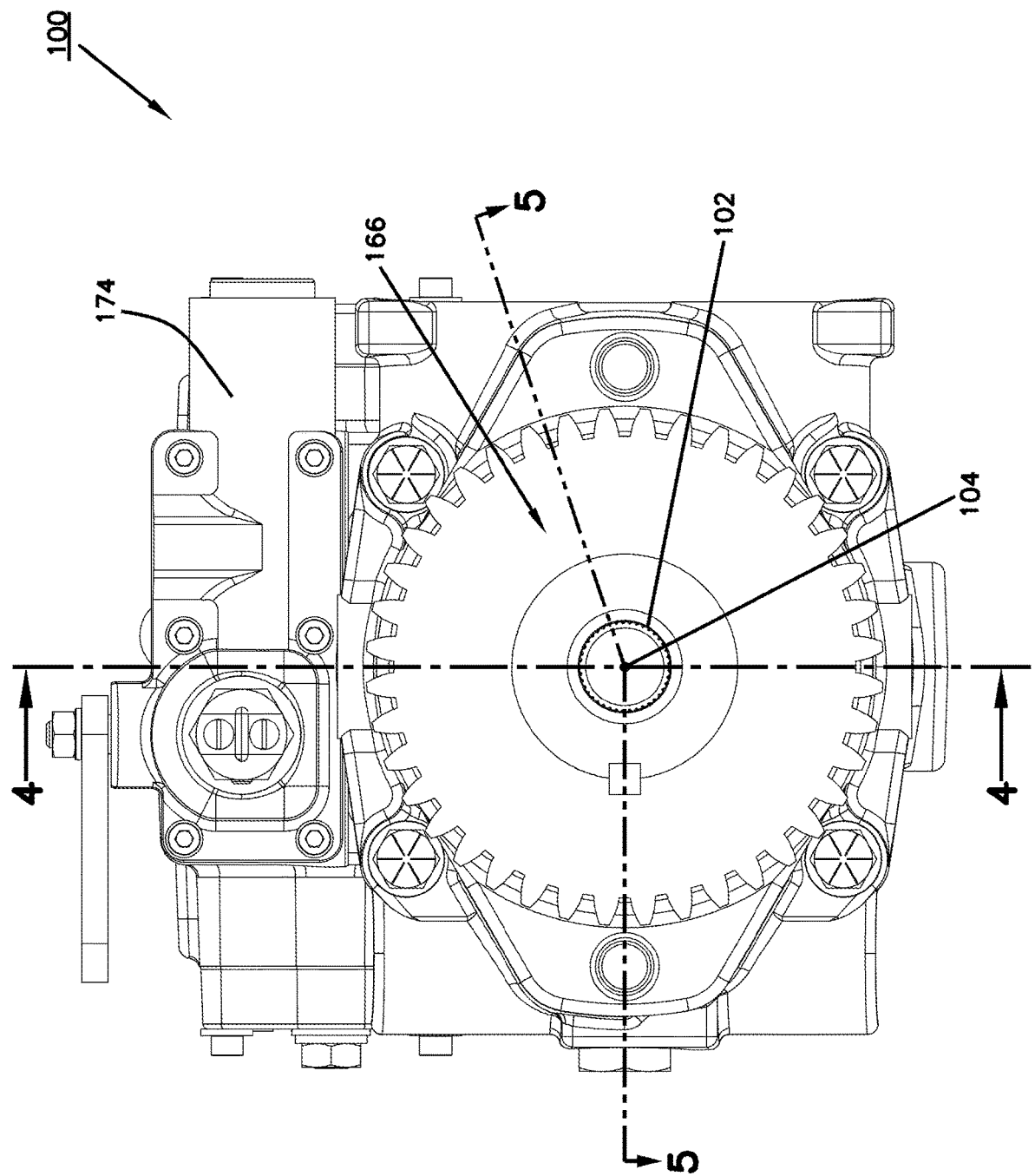
FIG. 2 is a rear view of the HMT of FIG. 1.
Figure 3:
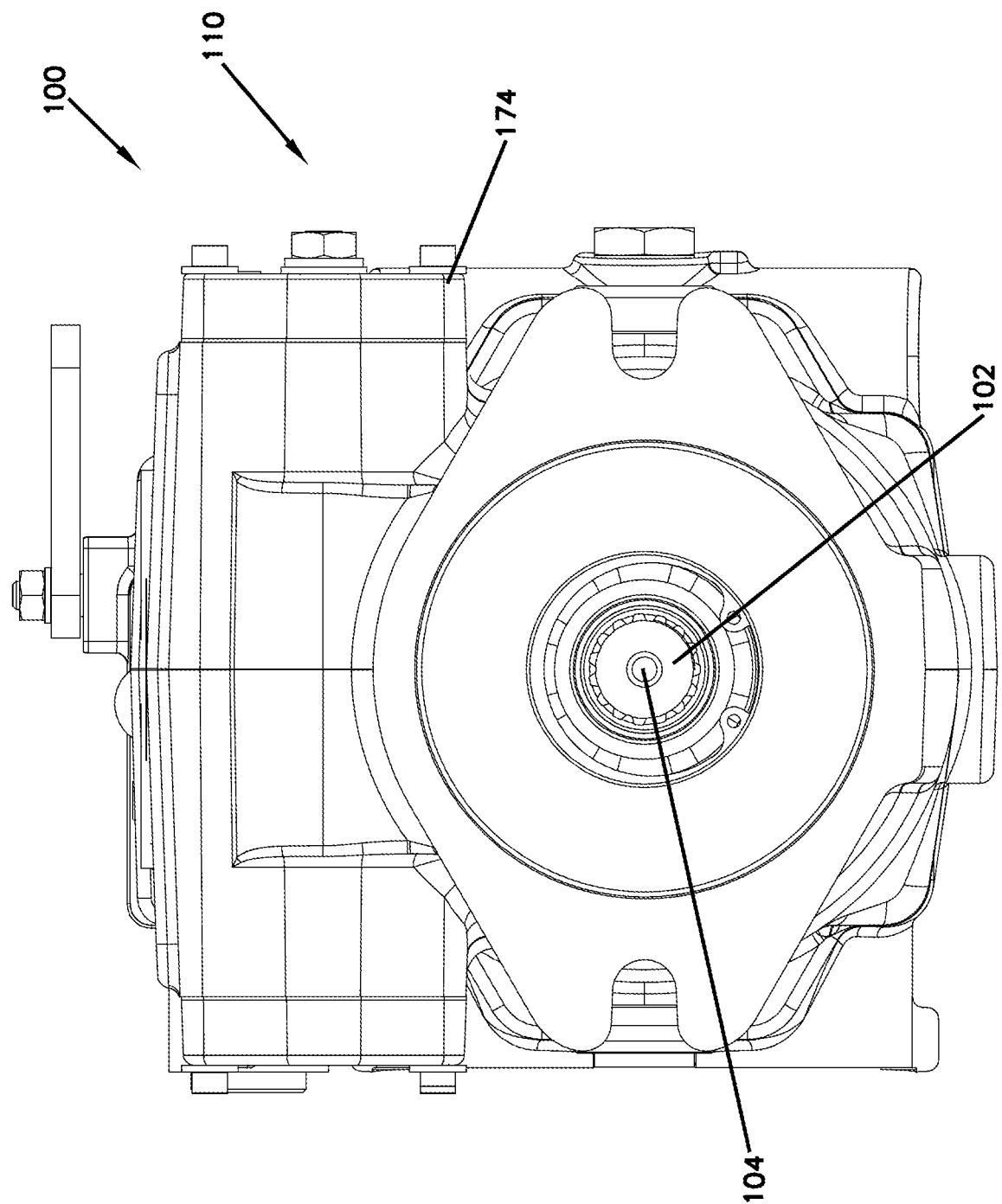
FIG. 3 is a front view of the HMT of FIG. 1.

With respect to the figures, FIGS. 1-3 depict overall views of a hydro-mechanical system (HMT) 100 in accordance with the principles of the present disclosure. The isometric view in FIG. 1 provides a perspective view of an exterior system configuration linking a pump section 101 and a motor section 103. The pump section includes a pump housing 174 and the motor section 101 includes a motor housing 175. A shaft 102 extends lengthwise through the pump section 101 and the motor section 103. The shaft is rotatable about a central longitudinal axis 104. The pump section 101 and the motor section 103 are mounted axially along the shaft 102.

Figure 4:
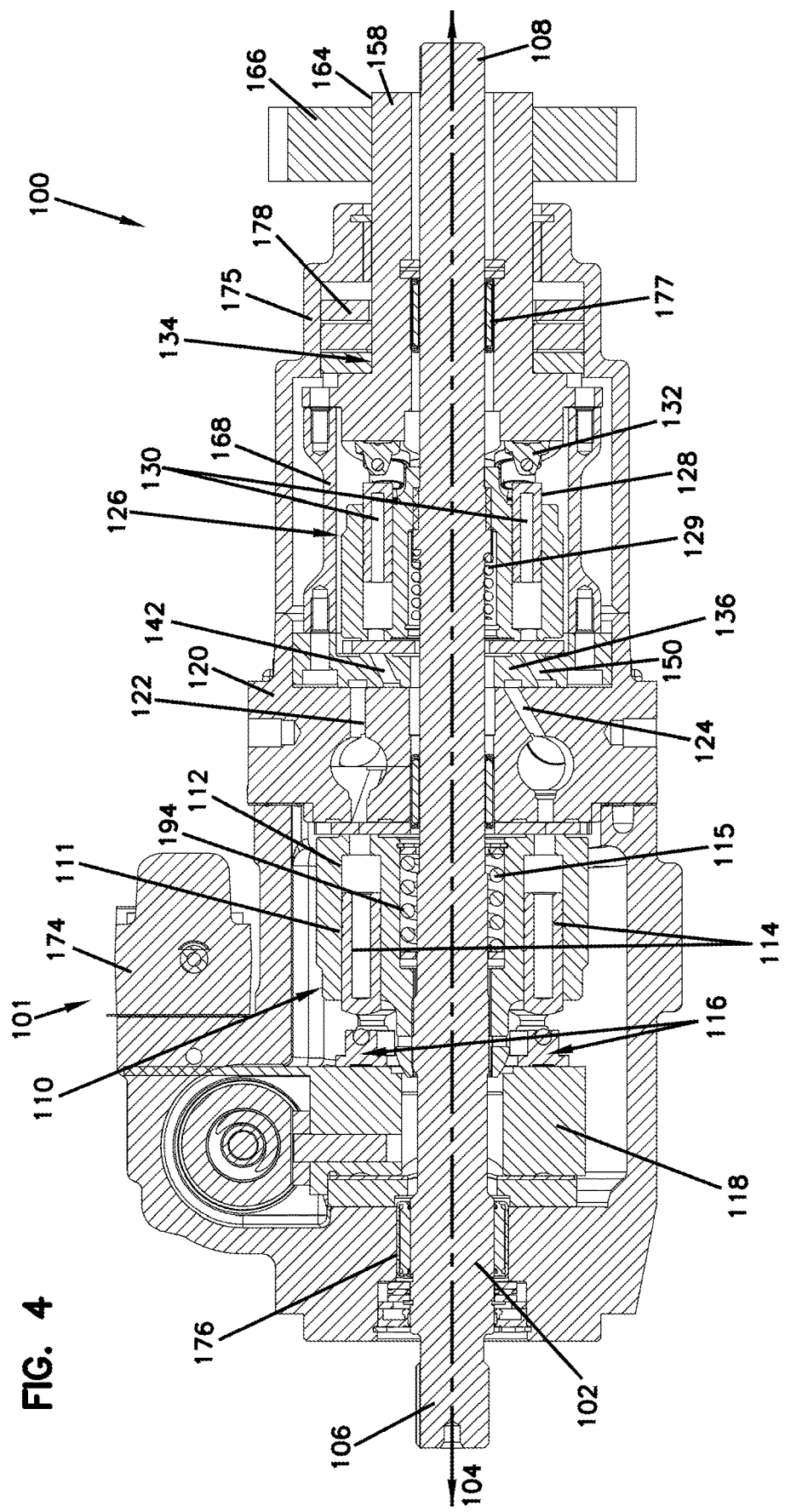
FIG. 4 is a cross sectional view of the HMT of FIG. 1 taken along section line 4-4 of FIG. 2.

FIG. 4 depicts a cross-sectional view along the longitudinal axis 104 of the shaft 102. The shaft 102 can include a torque input end 106. The torque input end 106 can be coupled to a source of torque such as an engine. In this way, the shaft 102 can be driven by the engine (not shown) such that torque is input into the HMT 100. As the engine provides torque to the shaft 102, the shaft can rotate along its longitudinal axis 104. The shaft 102 can be mechanically coupled to a pump rotating group 110 of the pump section 101 and a motor rotating group 126 of the motor section 103. A valve arrangement including a non-rotatable pump valve plate 120 and a rotatable motor valve plate 136 is positioned between the pump rotating group 110 and the motor rotating group 126.

The pump rotating group 110 can include: a pump cylinder barrel 112 and a plurality of pump pistons 114, having pump piston shoes 116 mounted at ends of the pistons 114. The pump section can also include a pump swash plate 118 and the pump valve plate 120. As the shaft 102 rotates, a mechanical coupling (e.g., a splined or keyed interface) between the shaft 102 and the pump cylinder barrel 112 can cause the pump cylinder barrel 112 to rotate in unison with the shaft 102 about the axis 104. Inside the pump cylinder barrel 112 is the plurality of pump pistons 114. The pistons 114 are mounted to reciprocate within cylinders 111 defined by the pump cylinder barrel 112.

Figure 6:
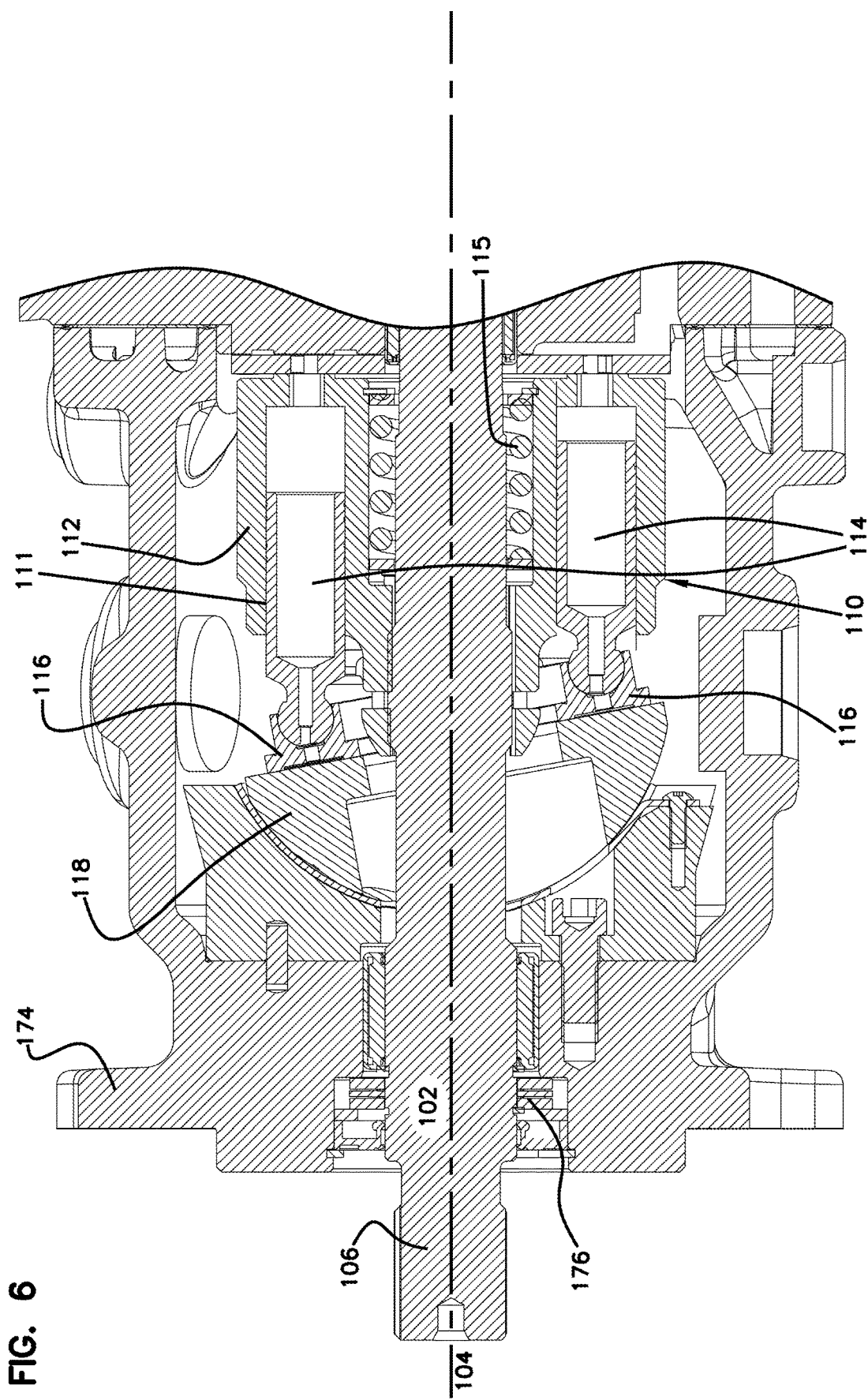
FIG. 6 is a cutaway cross sectional view of a pump portion of the HMT of FIG. 1.

FIG. 6 depicts a cutaway view of where the pump swash plate 118 has been adjusted to an angled orientation relative to the shaft 102. The pump swash plate 118 is pivotally mounted within the pump housing so that the angle of the swash plate 118 can be adjusted relative to the axis of rotation 104. The pump swash plate 118 is mounted so as to not rotate with the shaft 102 or the pump rotating group 110. The angled orientation of the pump swash plate 118 can force the plurality of pump pistons 114 to reciprocate between an extension and retraction phase as the pump rotating group 110 rotates about the axis 104 relative to the swash plate 118. The displacement of the pump can be adjusted by adjusting the angle of the pump swash plate 118. As the pump cylinder barrel 112 rotates, the plurality of pump pistons 114 can extend and retract to force hydraulic fluid in and out of the pump rotating group 110. Mechanically coupled to each piston 114 is a pump piston shoe 116. As pump cylinder barrel rotates 112, the pump pistons shoes 116 ride on and follow the pump swash plate 118. Accordingly, as the shoes 116 follow the angled swash plate during rotation of the rotating group 110, the pistons are pushed axially into the pump cylinder barrel 112 by the swash plate 118 during the retraction phase and move axially (e.g., are pulled or drawn axially) out of the pump cylinder barrel 112 during the extension phase. This generates a pumping action forcing hydraulic fluid out of the pump rotating group 110 into a pump valve plate 120 during the retraction phase and drawing hydraulic fluid from the pump valve plate 120 into the pump rotating group 110 during the extension phase.

After passing through the pump valve plate 120, the fluid can pass into the motor valve plate 136. After passing through the motor valve plate 136, the fluid can pass into the motor rotating group 126. The motor rotating group 126 can include: a motor cylinder barrel 128 and a plurality of motor pistons 130 having motor piston shoes 132. The motor rotating group 126 is mechanically coupled to the shaft 102 through the motor cylinder barrel 128 (e.g., via a splined or keyed interface). Accordingly, the motor cylinder barrel 128 can have the same rotating speed as the shaft 102 and the pump rotating group 110. As the motor cylinder barrel 128 rotates in unison with the shaft 102, the plurality of motor pistons 130 can cycle between extension and retraction phases through engagement between the piston shoes 132 and an angled motor swash plate 158.

Figure 5:
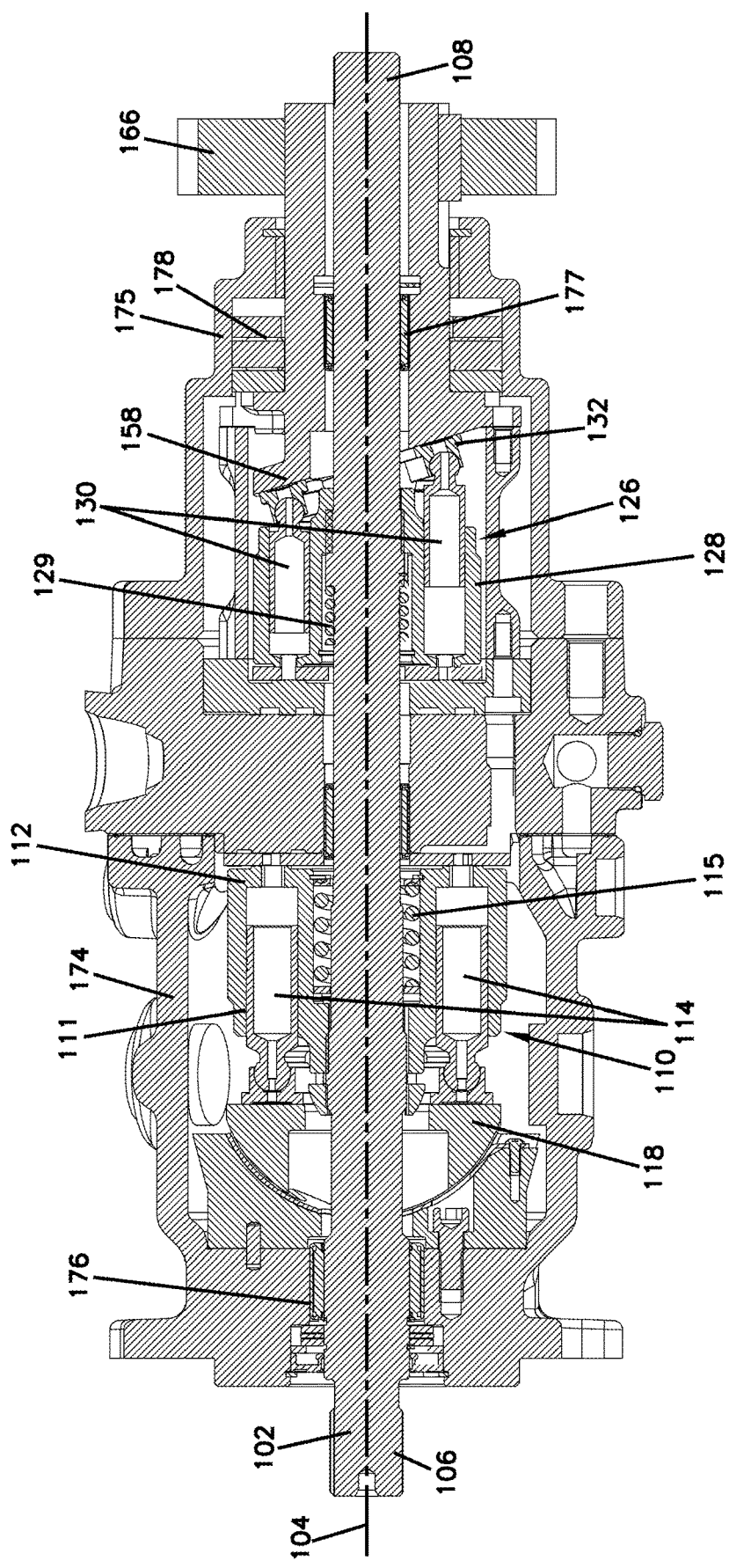
FIG. 5 is a cross sectional view of the HMT of FIG. 1 taken along section line 5-5 of FIG. 2.

As shown in FIG. 4 and FIG. 5, the motor rotating group 126 can interface with a torque output unit 134. The torque output unit 134 can include the motor valve plate 136, the motor swash plate 158 and a motor torque output section 164 having a mechanical output structure 166, such as a pulley or gear. The flow of hydraulic fluid is coordinated between the pump rotating group 110 and the motor rotating group 126 such that fluid is cycled in a closed loop between the pump rotating group 110 and the motor rotating group 126. As fluid enters the motor cylinder barrel 128 from the pump rotating group 110, the fluid forces the corresponding motor pistons 130 to extend. The extension of the motor pistons 130 can force the motor piston shoes 132 to exert a force on the motor swash plate 158. A component of the force on the motor swash plate can produce a torque on the motor swash plate 158 causing it to rotate relative to the shaft 102. The amount of torque applied to the motor swash plate 158 can be modified or adjusted by adjusting the displacement of the pump rotating group 110 thus adjusting the power/torque that is output from the HMT through the torque output section 164.

The motor swash plate 158 can be mechanically coupled to the motor valve plate 136, which also can rotate relative to the shaft 102. Thus, the motor swash plate 158, the motor valve plate 136, the torque output section 164, and the mechanical output structure 166 can all rotate in unison about the axis 104 at a rotational speed that differs from the rotational speed of the shaft 102, the pump rotating group 110, and the motor rotating group 126. By fixing the motor valve plate 136 relative to the motor swash plate 158, porting of the motor valve plate 136 can be fixed/set at a predetermined rotational orientation relative to the angle of the swash plate 158 to ensure coordination between the motor valve porting and the expansion and retraction phases of the motor rotating group 126. The motor valve plate 136 is fixed at a predetermined rotation position relative to the motor swash plate 158 such that an inlet port of the motor valve plate 136 is always in fluid communication with cylinders of the motor rotating group having pistons that are in the extension phase and an outlet port of the motor valve plate 136 is always in fluid communication with cylinders of the motor rotating group having pistons that are in the retraction phase.

The shaft 102 can extend from the pump rotating group 110, through the motor rotating group 126 and the torque output unit 134. The shaft can transfer power from the engine at the input end 106 to rotate the pump rotating group 110 and motor rotating group 126, along with providing torque that can be output directly from the shaft 102 at a power takeoff (PTO) end 108 of the shaft 102. A torque transfer element such as a pulley or gear can be mechanically coupled to the PTO allowing for power to be transferred directly from the shaft 102. The shaft 102 can rotate along its longitudinal axis 104. Rotation of the shaft 102 around its longitudinal axis 104 can be aided with the use of bearings. For example, a pump bearing 176 can be placed between the inner surface of the pump housing 174 enclosing the pump rotating group 110 and the shaft 102. The pump bearing 176 can function to maintain the pump rotating group 110 in co-axial alignment with the shaft 102. It will be appreciated that there can be other bearings similar to the pump bearing 176 oriented along the shaft 102 to maintain the co-axial alignment through the length of the shaft.

As discussed earlier, the pump rotating group 110 can include: the pump cylinder barrel 112, and the plurality of pump pistons 114 having the plurality of pump piston shoes 116. The pump rotating group can be enclosed by the pump housing 174. The shaft 102 can supply the mechanical energy necessary to operate the pump by applying/transferring torque to the pump cylinder barrel 112 causing the barrel 112 to rotate with the shaft 102. A spring 115 can apply an axial spring load to the pump cylinder barrel 112.

Figure 7:
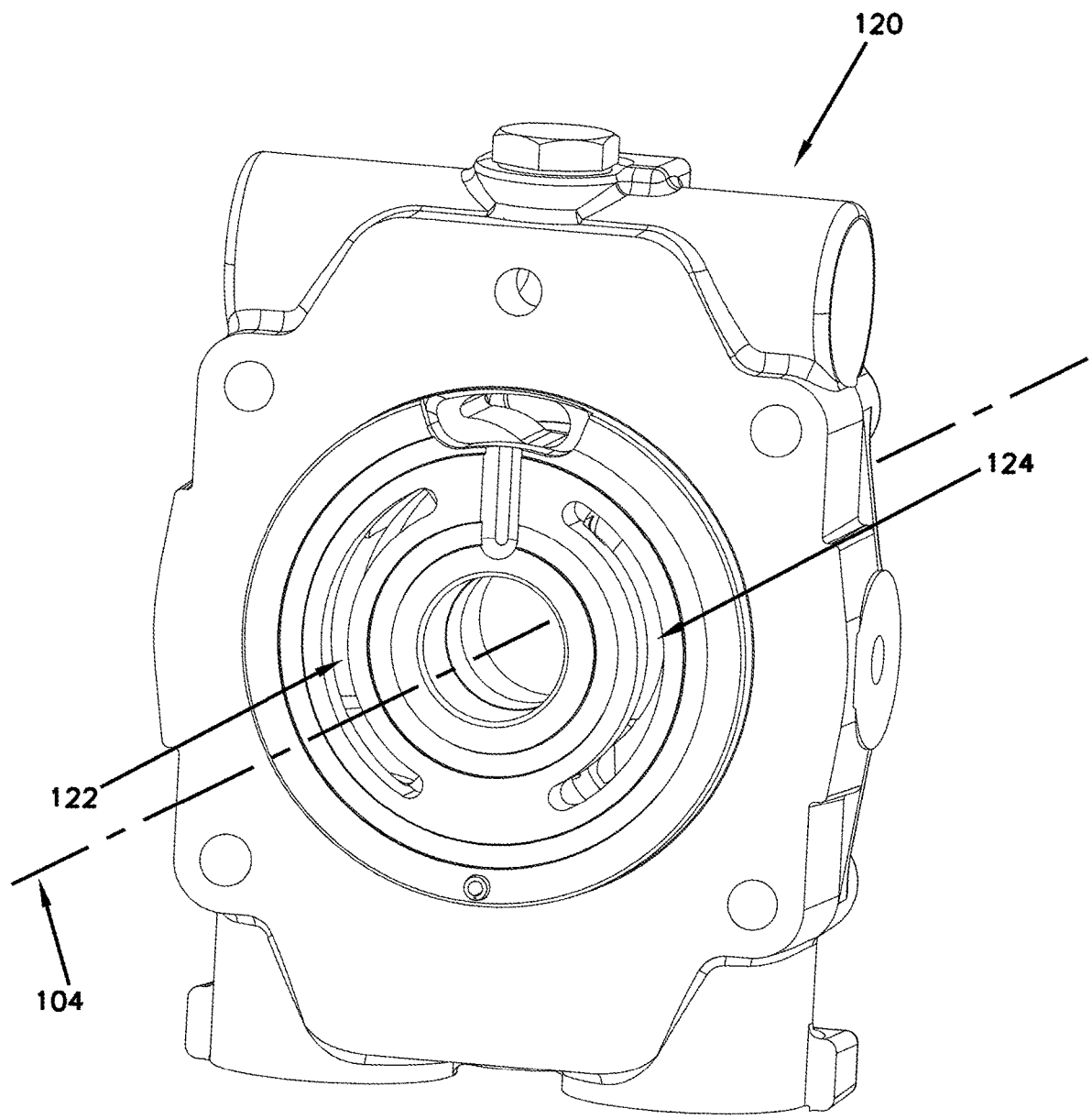
FIG. 7 is a front isometric view of a pump valve plate of the HMT of FIG. 1.
Figure 8:
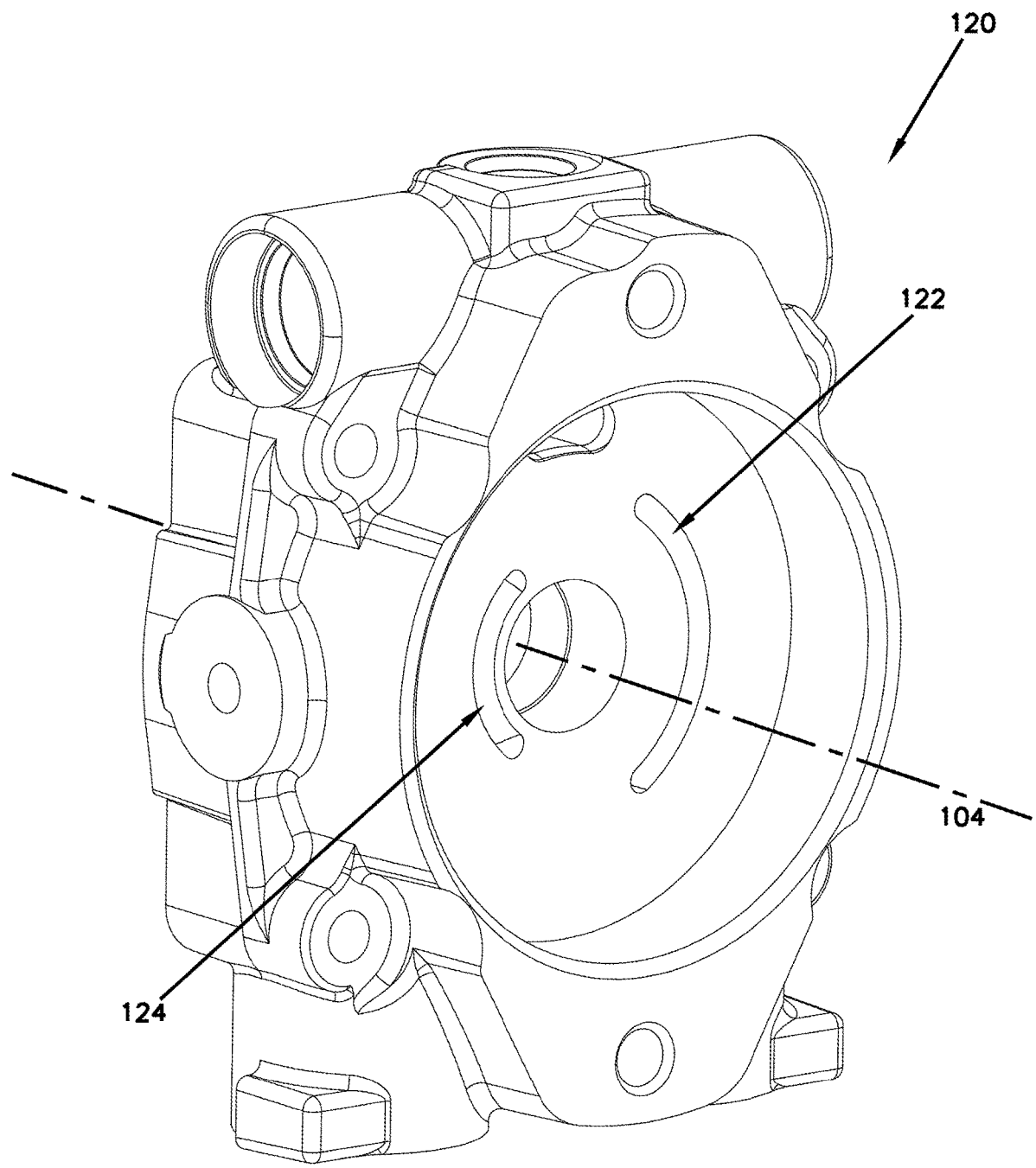
FIG. 8 is rear isometric view of the pump valve plate of FIG. 7.

FIGS. 7-8 depict the pump valve plate 120. FIG. 7 depicts an isometric view of a front side of the pump valve plate 120 which can face the pump rotating group 110. The pump valve plate 120 can include a pump output passage 124 for outputting hydraulic fluid pumped from the pump rotating group 110 and can include a pump inlet passage 122 for returning hydraulic fluid to the pump rotating group 110. In one example, the pump valve plate 120 does not rotate with the shaft 102 about the shaft axis 104. For example, the pump valve plate 120 can be secured (e.g., fastened) to a first axial end of the pump housing 174. The input end 106 of the shaft 102 can be accessible adjacent a second axial end of the pump housing 174.

When hydraulic fluid is forced from a cylinder 111 by one of the pistons 114, the fluid can have high pressure due to the force applied to it. The fluid can enter the pump valve plate 120 through the pump outlet passage 124. As shown in FIG. 8, the volume of the pump outlet passage 124 can decrease as the fluid passes from the front side of the pump valve plate 120 depicted in FIG. 7 to the back side of the pump valve plate. The decreased volume can add additional pressure to the transferring fluid do the inverse relationship between volume and pressure in a closed system. As the pressurized fluid exits the pump outlet passage 124, the fluid can pass through the motor valve plate 136 to the motor rotating group 126. The pump valve plate 120 is fixed in rotational position relative to the pump swash plate 118. In this way, the pump outlet passage 124 aligns with cylinders 111 having pistons 114 that are being forced into the cylinders 111 by the swash plate 118 as the pump rotating group 110 rotates about the axis 104. Thus, hydraulic fluid is forced from the cylinders 111 into the outlet passage 124. Similarly, the pump inlet passage 122 aligns with cylinders 111 having pistons 114 that are extending to follow the swash plate 118 as the pump rotating group 110 rotates about the axis 104. Thus, the pistons 114 are caused to extend from the cylinders 111 so that hydraulic fluid is drawn into the cylinders 111 from the pump inlet passage 122.

Figure 9:
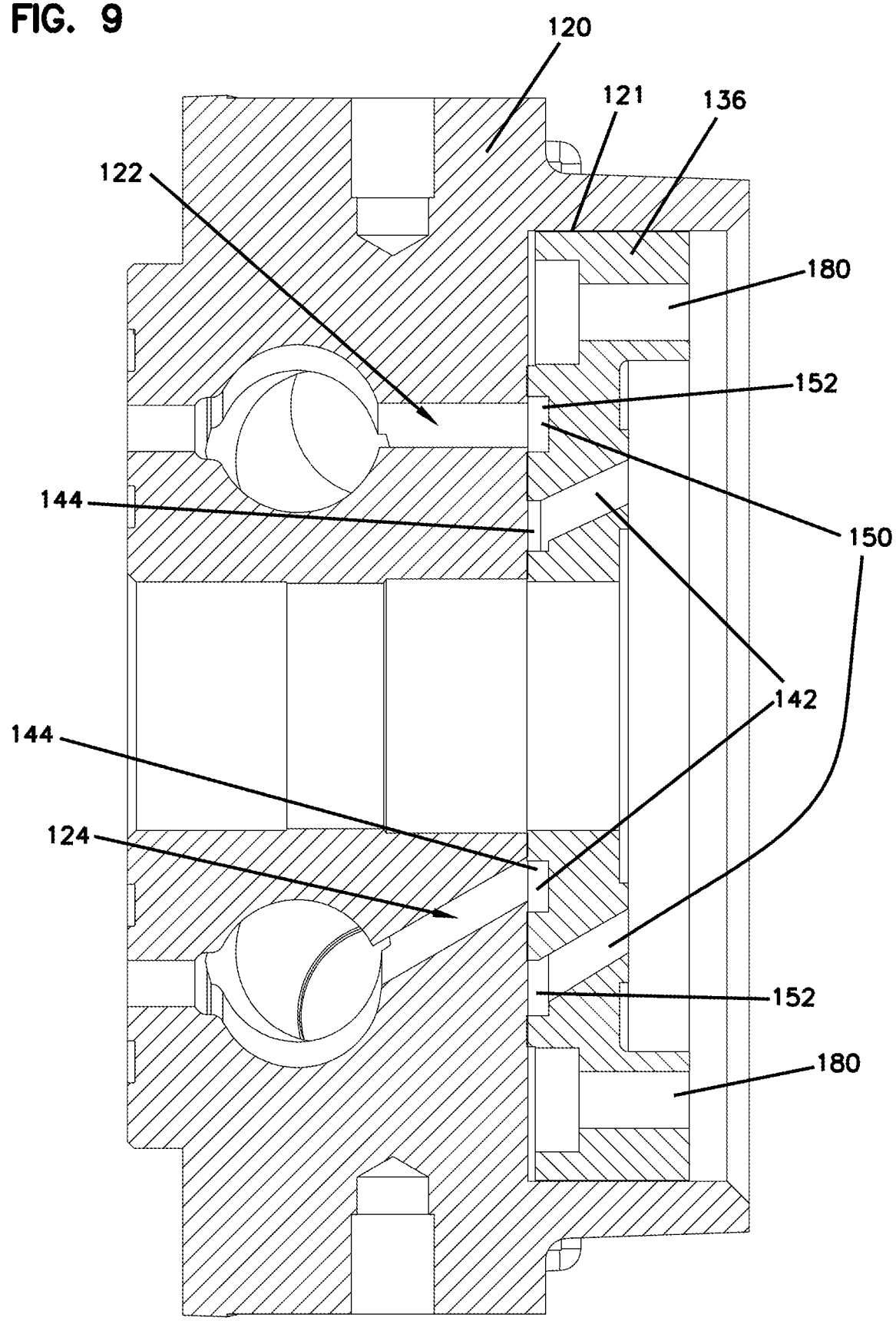
FIG. 9 is a cross sectional view of the pump valve plate of FIG. 7 and a corresponding motor valve plate of the HMT of FIG. 1.

FIG. 9 is a cross-sectional view of an embodiment depicting the interaction between the pump valve plate 120 and the motor valve plate 136. As also shown in FIG. 8, there is a circular cavity 121 on one side of the pump valve plate 120. The cavity can be orientated to receive the motor valve plate 136. The interaction between the pump rotating group 110 and the torque output unit 134 can be initiated through the fluid communication between pump valve plate 120 and motor valve plate 136. As depicted, a motor inlet passage 142 of the motor valve plate 136 can be in constant fluid communication with the pump outlet passage 124 and a motor outlet passage 150 of the motor valve plate 136 can be in constant fluid communication with the pump inlet passage 122.

Figure 10:
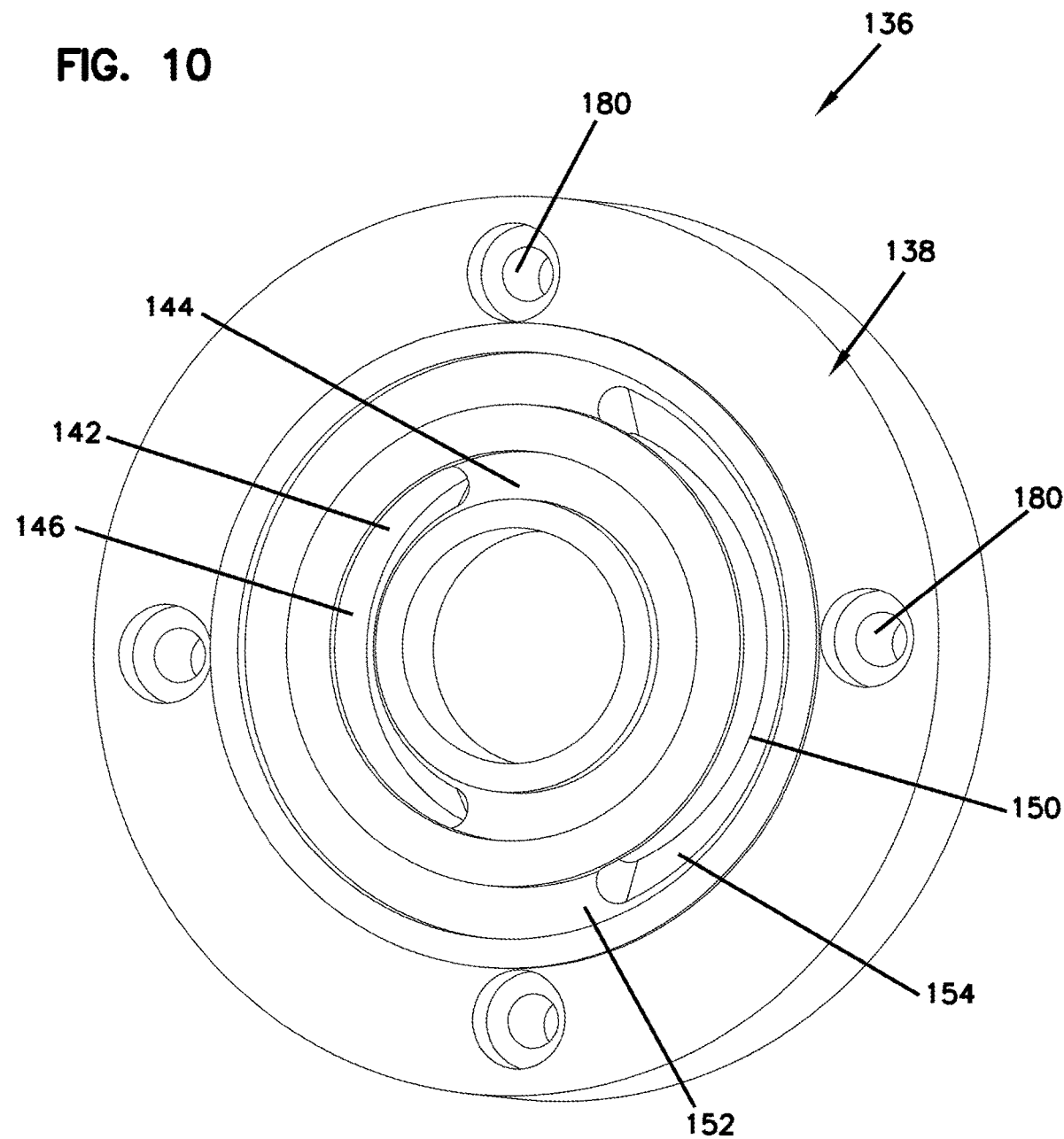
FIG. 10 is a front isometric view of the motor valve plate of FIG. 9.
Figure 11:
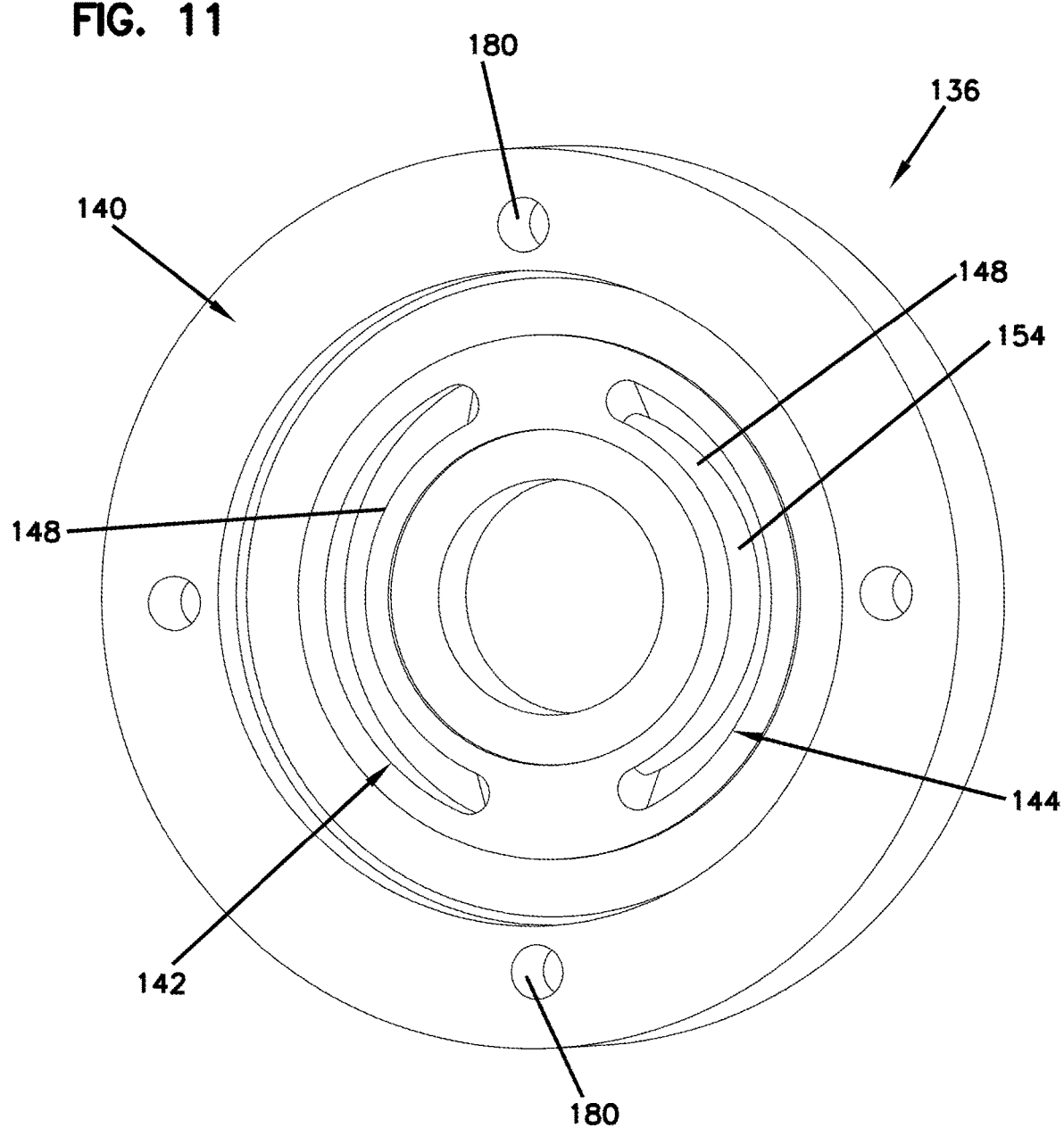
FIG. 11 is rear isometric view of the motor valve plate of FIG. 9.
Figure 12:
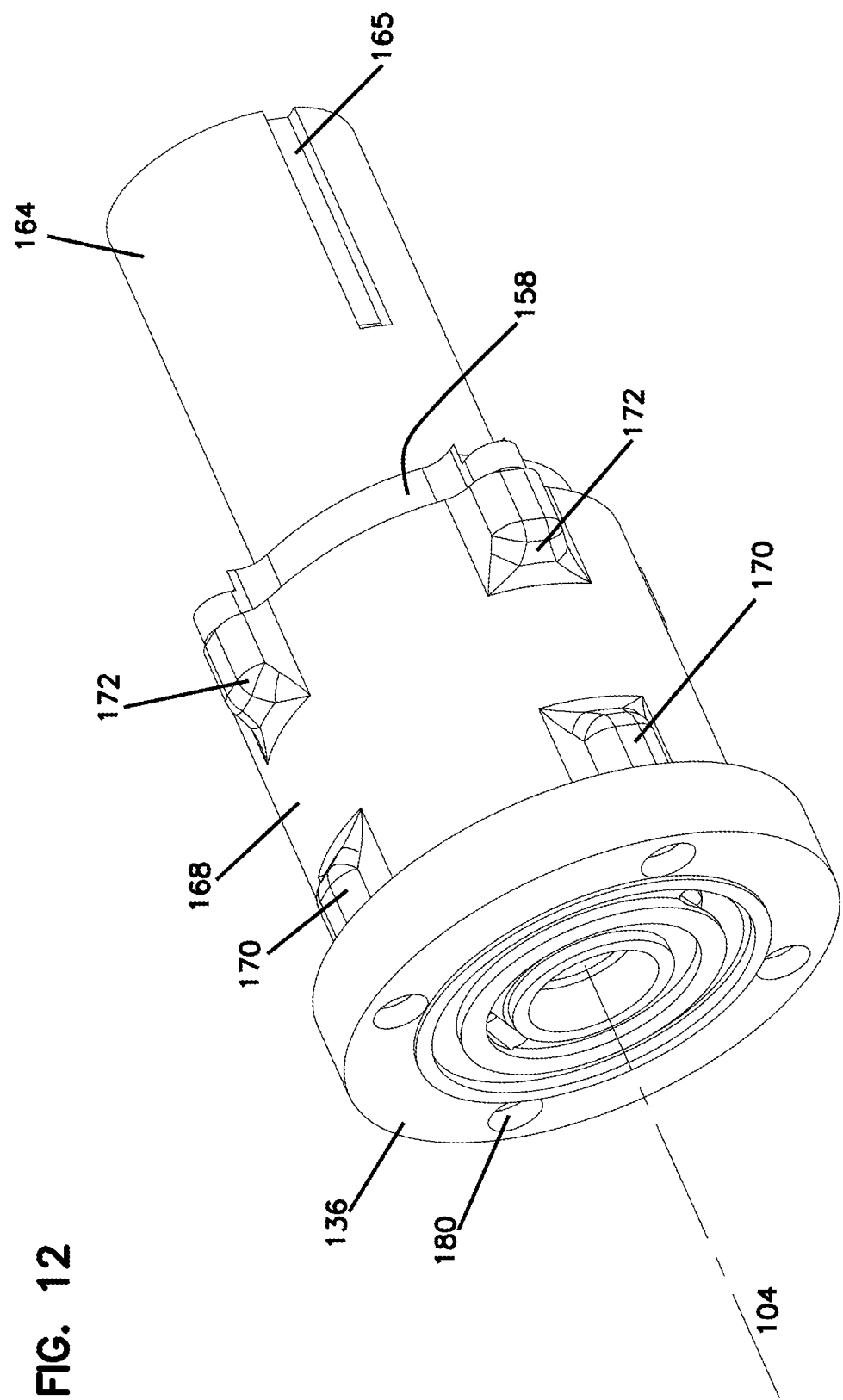
FIG. 12 is a front isometric view of a torque output unit of the HMT of FIG. 1.
Figure 13:
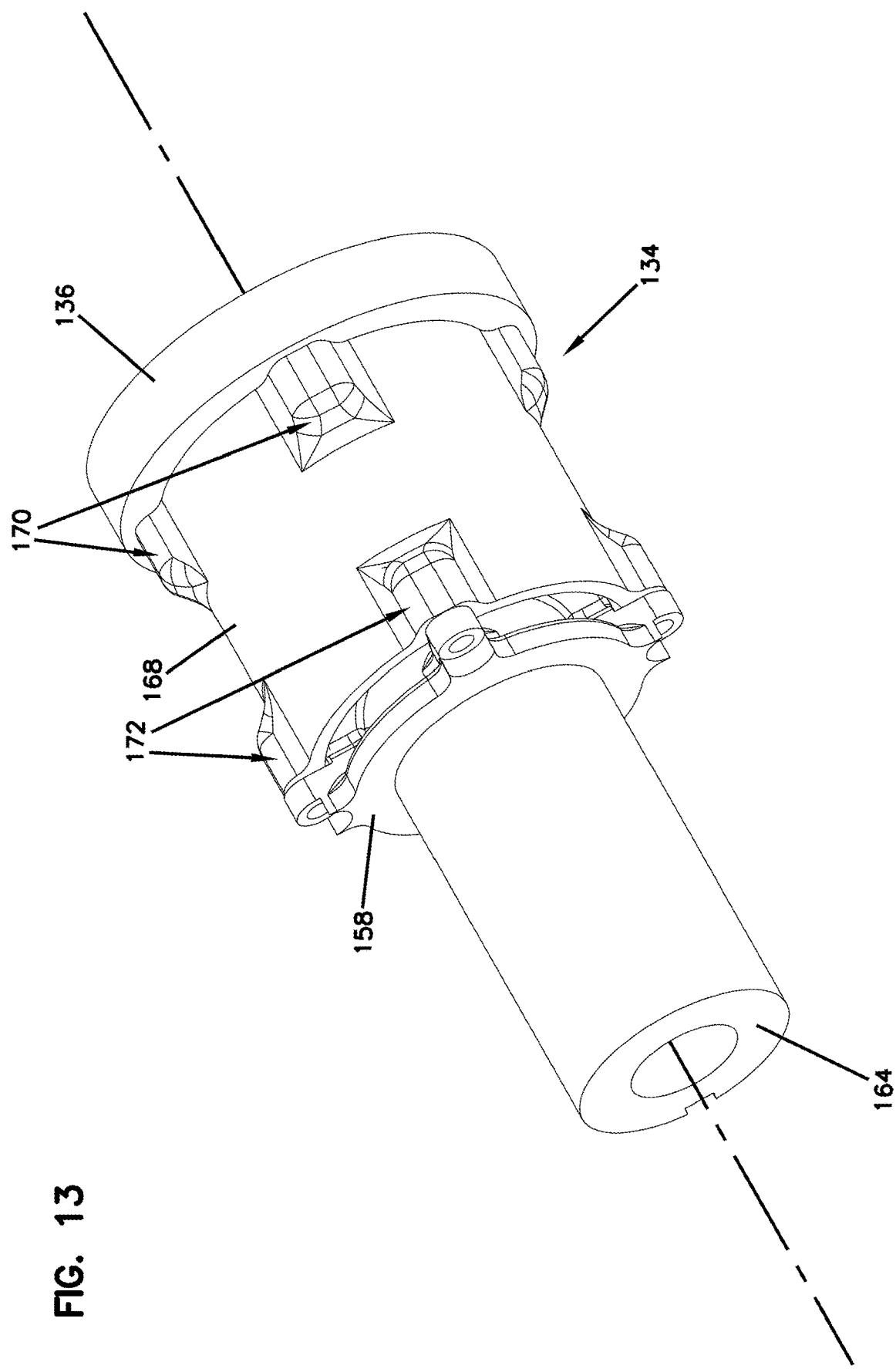
FIG. 13 is a rear isometric view of the torque output unit and of FIG. 12.
Figure 14:
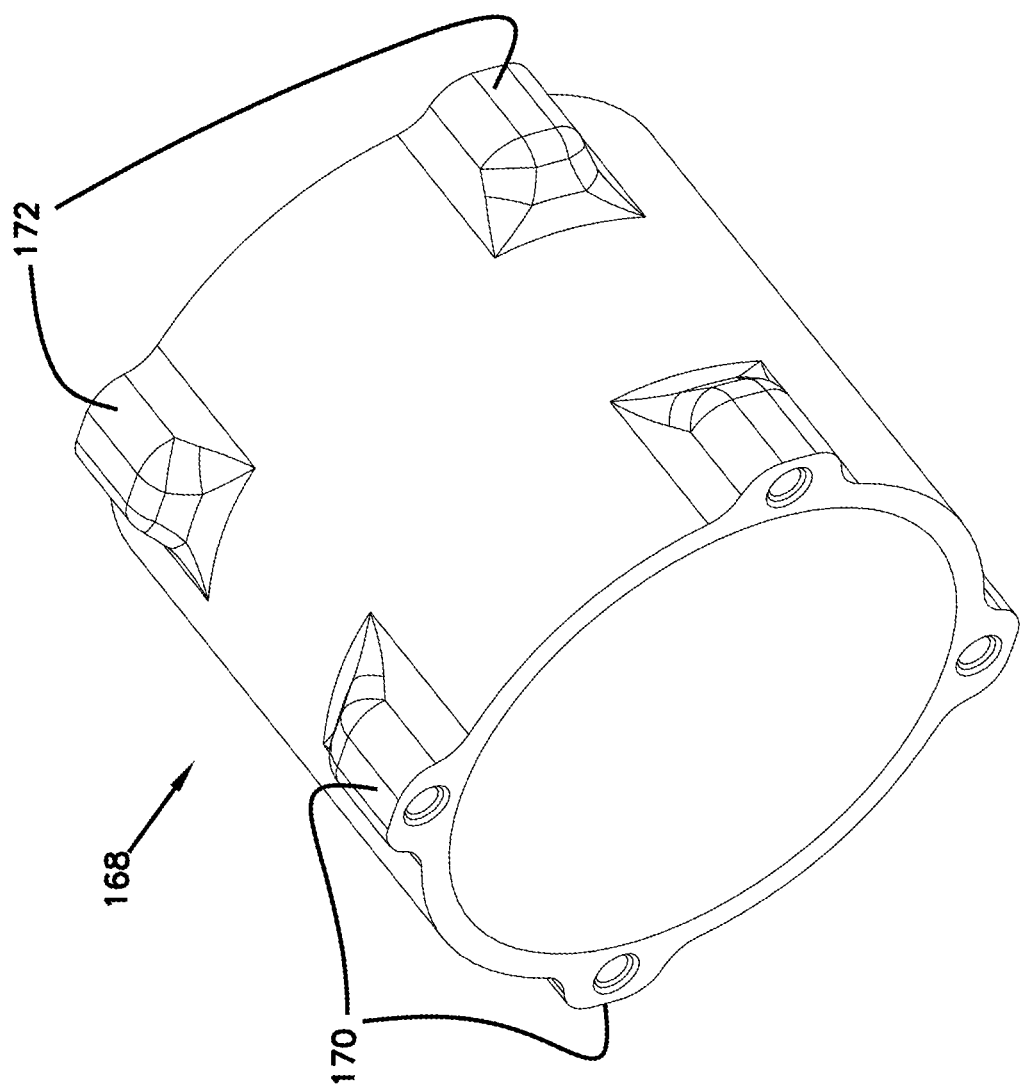
FIG. 14 is an isometric view of a coupling element of the torque output unit of FIG. 12.

FIGS. 10-11 depict isometric views of the motor valve plate 136. FIG. 10 depicts a first side of the motor valve plate 136 where in the first side 138 can be the side that faces toward the pump valve plate 120. FIG. 11 depicts a second side of the motor valve plate 136 that faces toward the motor rotating group 126. In one example, the motor inlet passage 142 can include an annular inlet groove 144 at the first side 138 of the motor valve plate 136. Functionally, the annular inlet groove 144 can provide constant fluid communication with the pump outlet passage 124 as the motor valve plate 136 rotates about the shaft axis 104. Similarly, the motor outlet passage 150 can include an annular outlet groove 152 at the first side 138 of the motor valve plate 136 that can provide constant fluid communication with the pump inlet passage 122 as the motor valve plate 136 rotates about the shaft axis 104. The annular inlet groove 144 can encircle the shaft axis 104. Similarly, the annular outlet groove 152 can encircle the shaft axis 104. The motor valve plate 136 can also define a plurality of motor valve plate linkage holes 180 at an outer radius of the motor valve plate. The motor valve plate linkage holes 180 can serve receptacles for facilitating fastening a coupling element between the motor valve plate 136 and the motor swash plate 158.

As discussed earlier, pressurized fluid that exits the pump outlet passage 124 can enter the motor valve plate 136 at the motor inlet passage 142. The pump outlet passage 124 can be aligned with the motor inlet passage 142 to facilitate fluid transfer. Similarly, hydraulic fluid circulates back from the motor rotating group 126 to enter the pump rotating group 110. The motor outlet passage 150 can be aligned with the pump inlet passage 122 to facilitate fluid transfer.

As shown in FIG. 11, an aspect of the second side of the motor valve plate 136 depicts a configuration of the second end 148 of the motor inlet passage 142 such that the shape can have semi-circular transverse cross-sectional shape that curves about the shaft axis 104. Similarly, the second end of the motor outlet passage can have a have semi-circular transverse cross-sectional shape that curves about the shaft axis 104.

Figure 15:
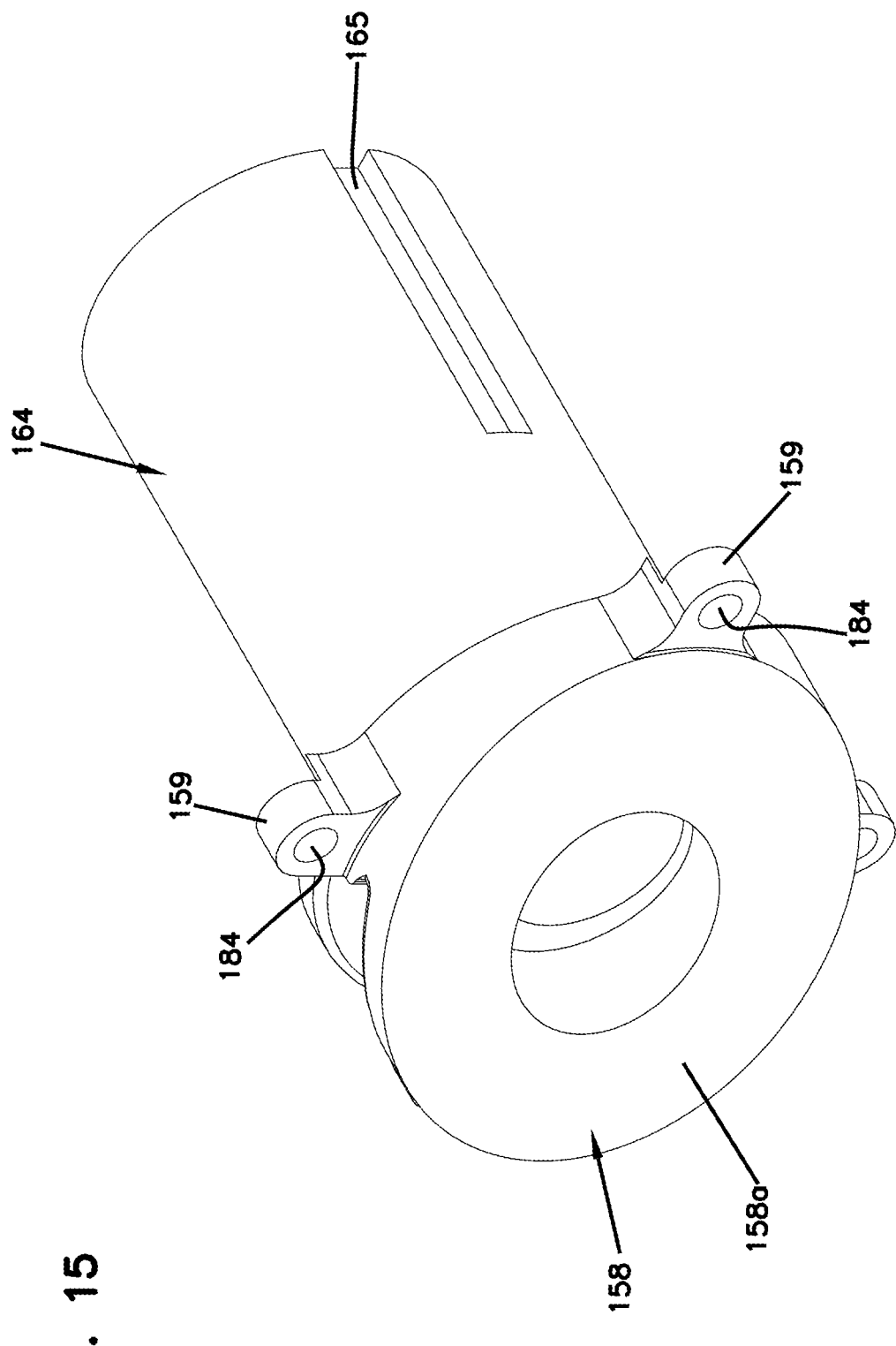
FIG. 15 is a front isometric view of a motor swash plate and a motor torque output section of the torque output unit of FIG. 12.
Figure 16:
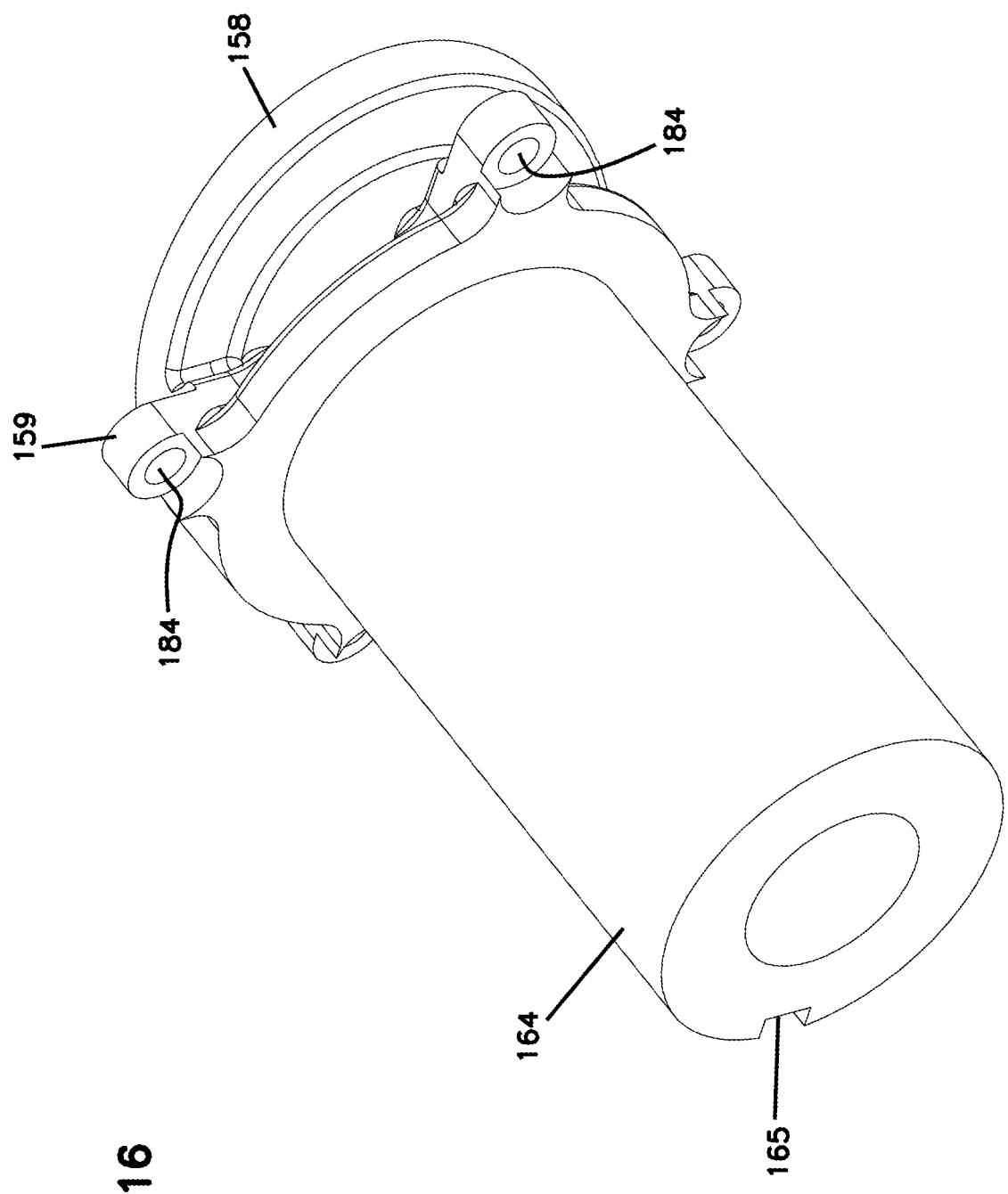
FIG. 16 is a rear isometric view of the motor swash plate and motor torque output section of FIG. 15.

FIGS. 12-17 depict an embodiment of the torque output unit 134. The torque output unit 134 can include the motor valve plate 136, the motor swash plate 158, and the motor torque output section 164. Each of the components can rotate in unison with each other about the axis 104. The torque output unit 134 can rotate at a different rotational speed than the shaft 102. FIGS. 15 and 16 depict an embodiment of the motor swash plate 158 and motor torque output section 164. A swash plate surface 158a of the motor swash plate 158 can form an angle relative to the longitudinal axis 104. The angled orientation of the motor swash plate 158 can cause the linear displacement of the plurality of motor pistons 130 as the motor rotating group 126 revolves around the shaft axis 104. The motor swash plate 158 can have a freedom of rotation around the shaft axis 104. In the depicted example, the angled orientation of the swash plate surface is fixed so the motor rotating group 126 functions as a fixed displacement motor.

To facilitate coupling to the other components of the torque output system, the motor swash plate can also include nodules 159 orientated along the radial periphery. Further, the nodules 159 can be axial offset from the surface swash plate so there they do not interfere with the plurality of motor piston shoes as they engage the surface of the motor swash plate 158. Each nodule 159 can define a motor swash plate linkage holes 184. The motor swash plate linkage holes 184 can be used to facilitate mechanically coupling the motor swash plate 158 to the motor valve plate 136 via a coupling element.

Another component of the torque output unit 134 can be the motor torque output section 164. The motor torque output unit 164 can include a member that extends from a connection location to the motor swash plate 158. The motor torque output section 164 can mechanically transfer torque from the motor swash plate 158 to a supplemental use. For example, a mechanical output structure 166 such as a gear or pulley can be connected to the axial end of the motor torque output section 164. In another aspect, the motor torque output section 164 can include a key 165. The key can comprise a slot that facilitates the connection of the mechanical output structure 166.

Components of the torque output unit 134 rotate in unison because they can be mechanically coupled using a coupling element. In one embodiment, the coupling element can be a structural member such as a rod linkage or other component. As shown in the FIGS. 12-18, the coupling element can be a coupling sleeve 168 that surrounds the motor rotating group 126. The coupling sleeve 168 shown in FIG. 14 can have nodules 170, 172. Further, the nodules 170, 172 can define voids that can serve as receptacles for mechanical linkages, such as fasteners. Thus, the torque output unit 134 can be mechanically coupled together by aligning the plurality of motor swash plate linkage holes 184 in the motor valve plate 136 with a first set of nodules 170 and aligning plurality of motor swash plate linkage holes 184 with a second set of nodules 172. Thus, the sleeve 168 couples the swash plate 158 to the motor valve plate 136. Once the holes are aligned, the torque output unit 134 can be secured using fasteners such as a bolt screw, rivet, or other fastener. The components can also be bonded, welded or otherwise coupled together.

Figure 17:
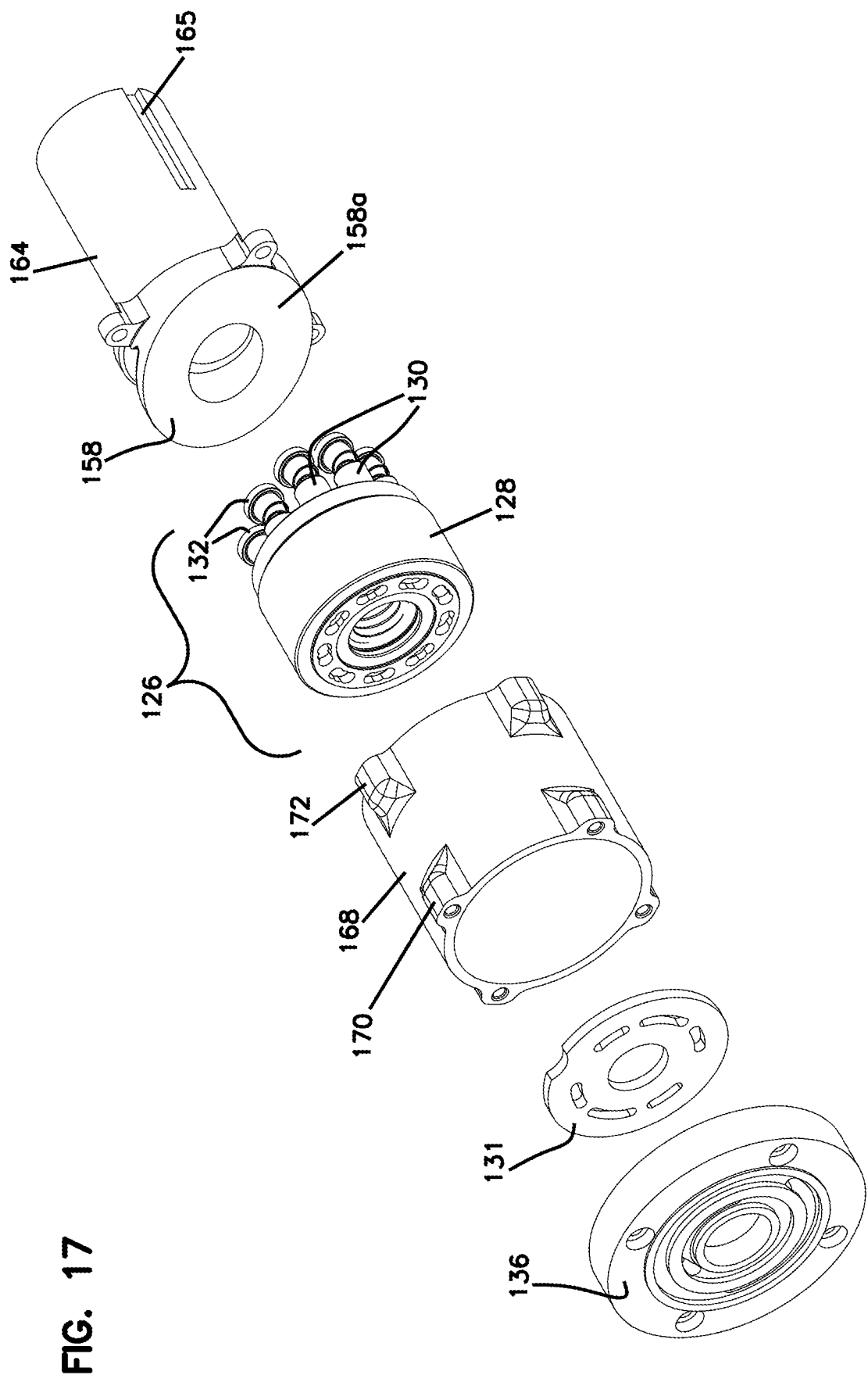
FIG. 17 is a front exploded view of the motor rotating group and torque output unit.
Figure 18:
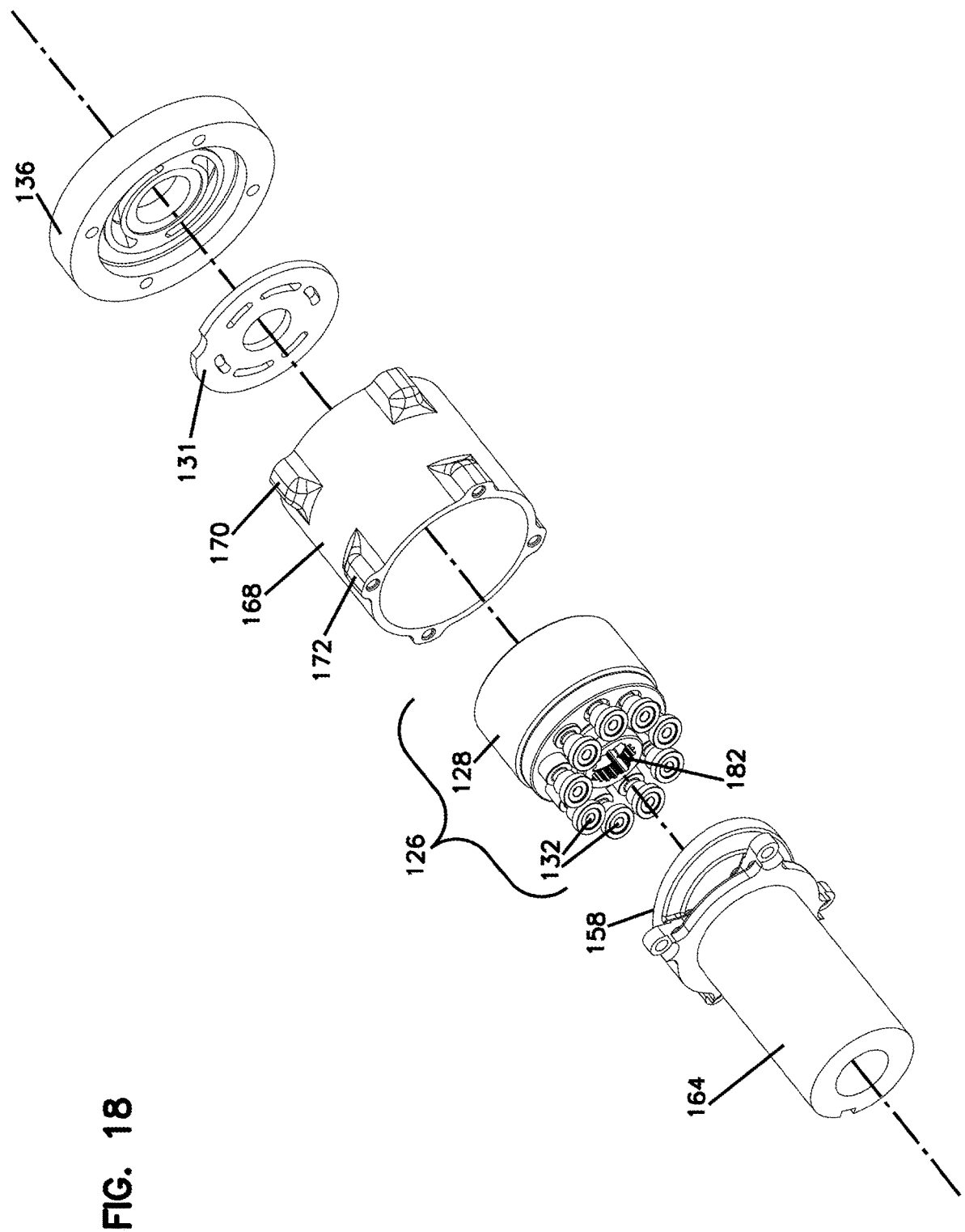
FIG. 18 is a rear exploded view of the motor rotating group and torque output unit.

As shown in FIG. 17-18, the torque output unit 134 can have multiple components contributing to its motion and subsequent torque output. As mentioned earlier, pressurized fluid enters the motor rotating group 126 through the motor valve plate 136. The pressurized fluid can interact with the motor rotating group 126. In certain embodiments, the motor rotating group 126 can simultaneously be acted upon through a mechanical coupling with the rotating shaft. The motor cylinder barrel can be mechanically coupled to the shaft (e.g., by a splined or keyed interface) such that the rotation of the shaft 102 can simultaneously rotate the motor cylinder barrel 128 in unison with the shaft 102. In one example, the motor rotating group 126 is positioned axially between the motor swash plate 158 and the motor valve plate 136.

In one example the motor rotating group 126, torque output unit 134, and motor torque output section 164 can be enclosed in a motor housing 175. The motor housing 175 can be oriented with a first axial end positioned adjacent to the motor valve plate 136 and a second axial end positioned adjacent to the motor torque output section 164 of the torque output unit 134. In addition, a motor bearing 178 can be positioned between the motor housing 175 and the torque output unit 134. Thus, the motor bearing 178 can aid the torque output unit 134 to rotate relative to the motor housing 175 about the shaft axis 104. The motor bearing 178 can function to maintain the torque output unit 134 in co-axial alignment with the shaft 102. Another bearing 177 can be positioned between the shaft 102 and by torque output unit 134.

Figure 19:
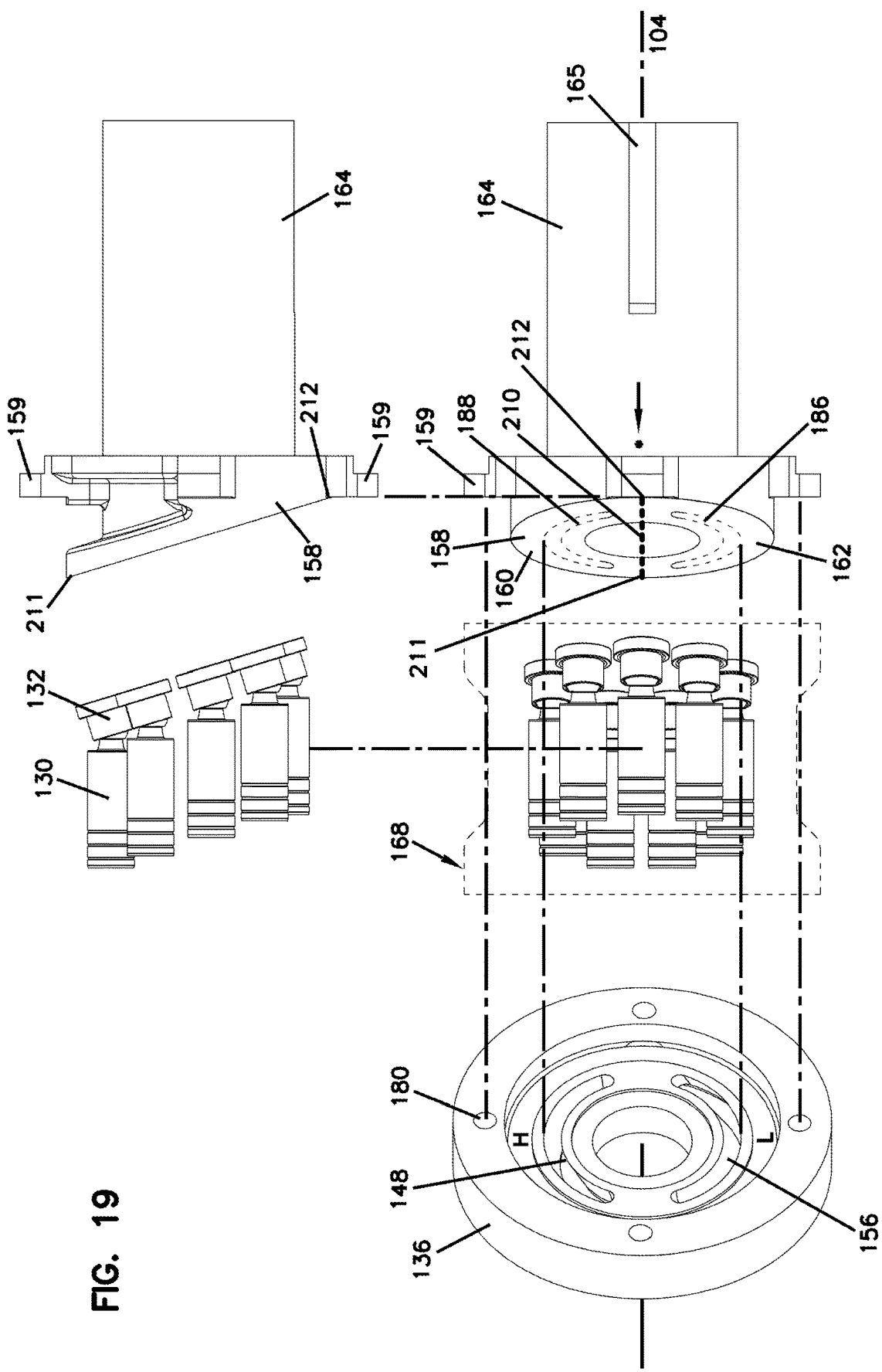
FIG. 19 is a diagrammatic view depicting the relative positioning of various components of the motor rotating group and the torque output unit.

The shaft 102 can be connected to the motor cylinder barrel 128 as depicted in FIGS. 17-19. Pressurized hydraulic fluid can pass from the motor valve plate 136 into the motor cylinder barrel 128. In one aspect of the embodiment, the motor cylinder barrel can comprise a port plate 131 that is not mechanically coupled to the motor cylinder barrel 128. In another aspect of the embodiment, the port plate 131 can be integrated into the surface of the motor cylinder barrel that engages the motor valve plate 136. Further, the motor cylinder barrel 128 can enclose a plurality of motor pistons 130, where the plurality of motor pistons 130 are connected to motor piston shoes 132. A loaded spring 129 can apply spring load to the motor cylinder barrel 128.

Figure 20:
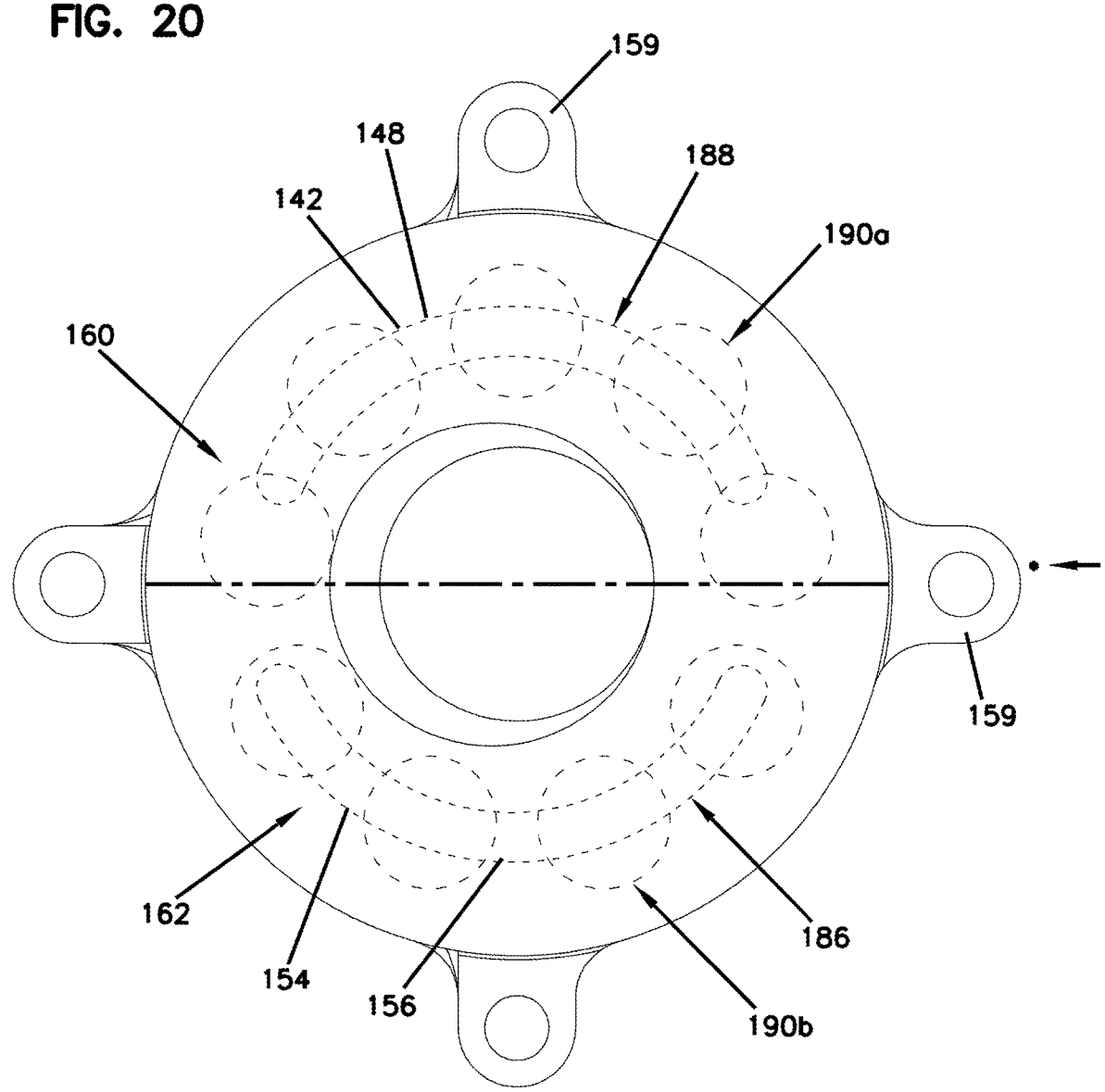
FIG. 20 is an end view of the motor swash plate with cylinder bores and valve plate porting superimposed thereon to diagrammatically portray relative positioning.

Referring to FIG. 20, the surface of the motor swash plate 158 can be conceptually be divided into an extension section 160 and a retraction section 162. For example, the extension section 160 can be characterized by a respective motor piston 130 transitioning from an initial retracted state to a final extended state as relative rotation occurs between the motor rotating group 126 and the swash plate 158 about the axis 104. Similarly, the retraction section 162 can be characterized by a respective motor piston 130 transitioning from an initial extended state to a final retracted state as relative rotation occurs between the motor rotating group 126 and the swash plate 156 about the axis 104. It will be appreciated that the torque output unit can rotate relative to the motor rotating group 126 and the shaft 102 about the axis 104. In operation, pressurized fluid from the pump rotating group 110 drives the motor pistons 130 against the motor swash plate 158 causing torque to be applied to the torque output unit 134 such that the torque output unit 134 rotates relative to the motor rotating group 126 and the shaft 102 at a different speed as compared to the motor relating group 126 and the shaft 102. As shown in FIG. 20, the extension section and retraction section can be semicircular in shape.

It will be appreciated that sleeve 168 functions to maintain a fixed rotational relationship between the swash plate 158 and by motor valve plate 136. Thus, the inlet and outlet passages 142, 156 of the motor valve plate 136 are retained in fixed rotational alignment with corresponding regions of the swash plate 158 even when the torque transfer unit is rotated. In one example, the second end 154 of the motor outlet passage 156 is retained in rotational alignment with the retraction sections 162 of the swash plate 158 and the second end 148 of the motor inlet passage 142 is retained in rotational alignment with the extension section 160 of the swash plate 158. In FIG. 19, this fixed alignment relationship is depicted by a conceptual/imaginary projection 188 of the end 148 of the inlet passage 142 superimposed onto the extension section 160 of the swash plate 158 and an conceptual/imaginary projection 186 of the end 154 of the motor outlet passage 156 superimposed onto the retraction section 162 of the swash plate. The extension and retraction sections 160, 162 are separated by an imaginary line 210 that extends between a first point 211 on the swash plate 158 that is closest to the motor cylinder barrel 128 and a second point 212 in the swash plate 158 that is farthest from the motor cylinder barrel 128. It will be appreciated that whether the sections 160, 162 function as retraction sections or extension sections depends upon the direction of relative rotation between the motor rotating group 126 and the motor swash plate 158.

FIG. 20 is an end view showing the fixed rotational alignment between the motor inlet passage 142 and the extension section 160 of the motor swash plate 158. Dashed lines representative of the projected positioning of the passages 142, 156 and the cylinders 90 have been superimposed on the swash plate to portray the relative positioning of the various structures. FIG. 20 also shows the fixed rotational alignment between the motor outlet passage 156 and the retraction section 162 of the motor swash plate 158. Additionally, a first set of motor cylinders 190a is shown in fluid communication with a motor inlet passage 148 and in alignment with the extension section 160. Further, a second set of motor cylinders 190b is shown in fluid communication with the motor outlet passage 156 and in alignment with the retraction section 162. When relative rotation occurs between the motor swash plate 158 and the motor rotating group 126, the motor cylinders transition between being aligned with the extension section 160 and in fluid communication with the motor inlet passage 142 and being aligned with the retraction section 162 and in fluid communication with the motor outlet passage 156.

When the fluid flows into the motor cylinder barrel 128, the pump pistons 114 can extend. Accordingly, the linear displacement of the extending plurality of pump pistons 114 can cause the motor piston shoes 132 to engage the surface of the motor swash plate 158. A force component resultant from the angled orientation of the motor swash plate 158 and a second force transferred from the displacement of the motor pistons 130 can produce a torque on the motor swash plate 158. The motor swash plate 158 can then rotate around the axis 104, producing the torque transferred to the motor torque output section 164. Further, during a portion of a rotational cycle about the axis 104, fluid can be forced from the motor cylinder barrel 128 to the second end 154 of the motor outlet passage 150. The fluid can subsequently pass through the motor valve plate 136 and exit through outlet passage 150. Once the fluid exits the motor valve plate 136, it can enter the pump rotating group 110 through the pump inlet passage 122, reinitiating the entire fluid cycle at the pump.

The present disclosure has been particularly shown and described with reference to the foregoing illustrations, which are merely illustrative of the best modes for carrying out the disclosure. It should be understood by those skilled in the art that various alternatives to the illustrations of the disclosure described herein can be employed in practicing the disclosure without departing from the spirit and scope of the disclosure as defined in the following claims. This description of the disclosure should be understood to include all novel and non-obvious combinations of elements described herein, and claims can be presented in this or a later application to any novel and non-obvious combination of these elements. Moreover, the foregoing illustrations are illustrative, and no single feature or element is essential to all possible combinations that can be claimed in this or a later application.

What is claimed is:

1. A hydro-mechanical transmission comprising:
    a shaft rotatable about a shaft axis, the shaft having an input end;
    a pump rotating group including a pump cylinder barrel that rotates in unison with the shaft about the shaft axis, the pump rotating group also including a plurality of pump pistons that axially reciprocate within pump cylinders defined by the pump cylinder barrel, the pump pistons including pump piston shoes;
    a pump swash plate that does not rotate with the shaft about the shaft axis, the pump swash plate being angularly adjustable relative to the shaft axis to adjust a displacement of the pump rotating group, the pump piston shoes riding on the pump swash plate,
    a pump valve plate that does not rotate with the shaft about the shaft axis, the valve plate including a pump output passage for outputting hydraulic fluid pumped from the pump rotating group and a pump inlet passage for returning hydraulic fluid to the pump rotating group;
    a motor rotating group including a motor cylinder barrel that rotates in unison with the shaft about the shaft axis, the motor rotating group also including a plurality of motor pistons that axially reciprocate within motor cylinders defined by the motor cylinder barrel, the motor pistons including motor piston shoes; and
    a torque output unit rotatable about the shaft axis relative to both the shaft and the motor rotating group, the torque output unit including a motor valve plate, a motor swash plate and a motor torque output section that all rotate in unison with one another about the shaft axis relative to the shaft and the motor rotating group, the motor valve plate including a motor inlet passage that provides fluid communication between the pump outlet passage and the motor rotating group and a motor outlet passage that provides fluid communication between the motor rotating group and the pump inlet passage, the motor piston shoes riding on the motor swash plate;
    wherein the shaft extends from the pump rotating group, through the motor rotating group and the motor torque output section such that the shaft projects beyond the motor torque output section;
    wherein the shaft has a power take-off end opposite from the input end; and wherein the power take-off end of the shaft is adapted to provide an accessible torque connection location for outputting torque directly from the shaft.

2. The hydro-mechanical transmission of claim 1, wherein the motor inlet passage is in constant fluid communication with the pump outlet passage and the motor outlet passage is in constant fluid communication with the pump inlet passage.

3. The hydro-mechanical transmission of claim 2, wherein the motor valve plate includes a first side that faces toward the pump valve plate and a second side that faces toward the motor rotating group;
   wherein the motor inlet passage includes a annular inlet groove at the first side of the motor valve plate that provides constant fluid communication with the pump outlet passage as the motor valve plate rotates about the shaft axis relative to the pump valve plate; and
   wherein the motor outlet passage includes an annular outlet groove at the first side of the motor valve plate that provides constant fluid communication with the pump inlet passage as the motor valve plate rotates about the shaft axis relative to the pump valve plate.

4. The hydro-mechanical transmission of claim 1, wherein the motor valve plate includes a first side that faces toward the pump valve plate and a second side that faces toward the motor rotating group;
   wherein the motor swash plate has a piston extension section and a piston retraction section;
   wherein during rotation of the motor rotating group about the shaft axis the motor pistons extend from the motor cylinder barrel when the motor piston shoes of the motor pistons ride along the piston extension section of the motor swash plate;
   wherein during rotation of the motor rotating group about the shaft axis the motor pistons retract into the motor cylinder barrel when the motor piston shoes of the motor pistons ride along the piston retraction section of the motor swash plate;
   wherein a first end of the motor inlet passage is located at the first side of the motor valve plate and aligns with the pump outlet passage;
   wherein a second end of the motor inlet passage is located at the second side of the motor valve plate and aligns with the piston extension section of the motor swash plate;
   wherein a first end of the motor outlet passage is located at the first side of the motor valve plate and aligns with the pump inlet passage; and
   wherein a second end of the motor outlet passage is located at the second side of the motor valve plate and aligns with the piston retraction section of the motor swash plate.

5. The hydro-mechanical transmission of claim 4, wherein the first end of the motor inlet passage and the first end of the motor outlet passage include annular grooves that encircle the shaft axis; and
   wherein the annular groove corresponding to the first end of the motor inlet passage aligns with the pump outlet passage and the annular groove corresponding to the first end of the motor outlet passage aligns with the pump inlet passage.

6. The hydro-mechanical transmission of claim 5, wherein the second end of the motor inlet passage and the second end of the motor outlet passage have semi-circular transverse cross-sectional shapes that curve about the shaft axis;
   wherein the piston retraction section and the piston extension section of the motor swash plate have semi-circular shapes;
   wherein the semi-circular transverse cross-sectional shape of the second end of the motor inlet passage is fixed in rotational alignment about the shaft axis relative to the semi-circular shape of the piston extension section of the motor swash plate; and
   wherein the semi-circular transverse cross-sectional shape of the second end of the motor outlet passage is fixed in rotational alignment about the shaft axis relative to the semi-circular shape of the piston retraction section of the motor swash plate.

7. The hydro-mechanical transmission of claim 1, wherein the pump swash plate has a piston extension section and a piston retraction section;
   wherein during rotation of the pump rotating group about the shaft axis while the pump swash plate is angled the pump pistons extend from the pump cylinder barrel when the pump piston shoes of the pump pistons ride along the piston extension section of the pump swash plate; and
   wherein during rotation of the pump rotating group about the shaft axis while the pump swash plate is angled the pump pistons retract into the pump cylinder barrel when the pump piston shoes of the pump pistons ride along the piston retraction section of the pump swash plate.

8. The hydro-mechanical transmission of claim 1, wherein the motor rotating group is positioned axially between the motor swash plate and the motor valve plate; and
   wherein a coupling element extends across a length of the motor rotating group and mechanically couples the motor swash plate to the motor valve plate such that the motor valve plate and the motor swash plate are secured in fixed rotational positions relative to one another about the shaft axis;
   the motor swash plate, the coupling element and the motor valve plate being configured to rotate in unison with one another about the shaft axis.

9. The hydro-mechanical transmission of claim 8, wherein the coupling element includes a structural member.

10. The hydro-mechanical transmission of claim 9, wherein the structural member is mechanically fastened to the motor swash plate and the motor valve plate by fasteners.

11. The hydro-mechanical transmission of claim 10, wherein the structural member includes coupling sleeve that surrounds the motor rotating group, the coupling sleeve having a first axial end fastened to the motor valve plate and a second axis end fastened to the motor swash plate.

12. The hydro-mechanical transmission of claim 1, wherein the motor torque output section of the torque output unit includes torque output structure for mechanically transferring torque from the hydro-mechanical transmission.

13. The hydro-mechanical transmission of claim 12, wherein the torque output structure includes a pulley or a gear.

14. The hydro-mechanical transmission of claim 1, wherein the motor swash plate is oriented at a fixed non-perpendicular angle relative to the shaft axis.

15. The hydro-mechanical transmission of claim 1, further comprising a pump housing enclosing the pump rotating group and the pump swash plate, the pump valve plate being secured to a first axial end of the pump housing and the input end of the shaft being accessible adjacent a second axial end of the pump housing.

16. The hydro-mechanical transmission of claim 15, further comprising a bearing positioned between the pump housing and the shaft for allowing the shaft to rotate about the shaft axis relative to the pump housing.

17. The hydro-mechanical transmission of claim 16, further comprising a motor housing that encloses the motor rotating group and the motor swash plate, the motor housing having a first axial end positioned adjacent to the motor valve plate and a second axial end positioned adjacent to the motor torque output section of the torque output unit.

18. The hydro-mechanical transmission of claim 17, wherein the first axial end of the motor housing is fixed relative to the pump valve plate;
- wherein a bearing is positioned between the motor housing and the torque output unit for allowing the torque output unit to rotate relative to the motor housing about the shaft axis; and
- wherein the bearing and the motor housing maintains the torque output unit in co-axial alignment with the shaft.

19. The hydro-mechanical transmission of claim 1, wherein the pump cylinder barrel and the motor cylinder barrel are each connected to the shaft by a respective splined connection.

* * * * *